United States Patent
Hirai et al.

(10) Patent No.: US 12,442,017 B2
(45) Date of Patent: Oct. 14, 2025

(54) MICROGLIAL SELECTIVE GENE EXPRESSION VECTOR

(71) Applicant: NATIONAL UNIVERSITY CORPORATION GUNMA UNIVERSITY, Gunma (JP)

(72) Inventors: Hirokazu Hirai, Gunma (JP); Yukihiro Okada, Gunma (JP)

(73) Assignee: NATIONAL UNIVERSITY CORPORATION GUNMA UNIVERSITY, Gunma (JP)

( * ) Notice: Subject to any disclaimer, the term of this patent is extended or adjusted under 35 U.S.C. 154(b) by 502 days.

(21) Appl. No.: 17/908,425

(22) PCT Filed: Feb. 24, 2021

(86) PCT No.: PCT/JP2021/006921
§ 371 (c)(1),
(2) Date: Aug. 31, 2022

(87) PCT Pub. No.: WO2021/177116
PCT Pub. Date: Sep. 10, 2021

(65) Prior Publication Data
US 2023/0399655 A1 Dec. 14, 2023

(30) Foreign Application Priority Data
Mar. 2, 2020 (JP) .................. 2020-034991

(51) Int. Cl.
*C12N 15/86* (2006.01)
*A61K 48/00* (2006.01)

(52) U.S. Cl.
CPC .......... *C12N 15/86* (2013.01); *A61K 48/0058* (2013.01); *A61K 48/0075* (2013.01); *C12N 2750/14143* (2013.01); *C12N 2750/14171* (2013.01); *C12N 2830/48* (2013.01)

(58) Field of Classification Search
CPC ......... C12N 15/86; C12N 5/10; C12N 15/113
See application file for complete search history.

(56) References Cited

U.S. PATENT DOCUMENTS

2013/0195801 A1   8/2013   Gao et al.
2019/0111157 A1   4/2019   Stanek et al.

FOREIGN PATENT DOCUMENTS

JP   WO 05/090561   9/2005
JP   2018-506585    3/2018
JP   6422897        11/2018

OTHER PUBLICATIONS

Hirasawa T, Ohsawa K, Imai Y, Ondo Y, Akazawa C, Uchino S, Kohsaka S. Visualization of microglia in living tissues using Iba1-EGFP transgenic mice. J Neurosci Res. Aug. 1, 2005;81(3):357-62. doi: 10.1002/jnr.20480. PMID: 15948177. (Year: 2005).*
Zufferey R, Donello JE, Trono D, Hope TJ. Woodchuck hepatitis virus posttranscriptional regulatory element enhances expression of transgenes delivered by retroviral vectors. J Virol. Apr. 1999;73(4):2886-92. doi: 10.1128/JVI.73.4.2886-2892.1999. PMID: 10074136; PMCID: PMC104046. (Year: 1999).*
International Search Report issued May 11, 2021 in International (PCT) Application No. PCT/JP2021/006921.
Maes, Margaret et al., "Targeting microglia with lentivirus and AAV: Recent advances and remaining challenges", Neuroscience Letters, 2019, vol. 707, No. 134310, 10 pages.
Akerblom, Malin et al., "Visualization and genetic modification of resident brain microglia using lentiviral vectors regulated by microRNA-9", Nature Communications, 2013, vol. 4, No. 1770, 8 pages.
Brawek, Bianca et al., "A new approach for ratiometric in vivo calcium imaging of microglia", Scientific Reports, 2017, vol. 7, No. 6030, 13 pages.
Rosario, Awilda M. et al., "Microglia-specific targeting by novel capsid-modified AAV6 vectors", Molecular Therapy-Methods & Clinical Development, 2016, vol. 3, No. 16026, 9 pages.
Joviičič, Ana et al., "Comprehensive Expression Analyses of Neural Cell-Type-Specific miRNAs Identify New Determinants of the Specification and Maintenance of Neuronal Phenotypes", The Journal of Neuroscience, Mar. 2013, vol. 33, No. 12, pp. 5127-5137.
Shiba, Yuji et al, "Allogenic transplantation of iPS cell-deprived cardiomyocytes regenerates primate hearts", Nature, 2016, vol. 538, pp. 388-391.

* cited by examiner

*Primary Examiner* — Fereydoun G Sajjadi
*Assistant Examiner* — Qinhua Gu
(74) *Attorney, Agent, or Firm* — Wenderoth, Lind & Ponack, L.L.P.

(57) ABSTRACT

A promoter on an AAV vector was changed to an Iba1 promoter, and a configuration that combined a miR-9 complementary sequence (miR-9T) and a miR-129 complementary sequence (miR-129T) was adopted. An exogenous gene was clarified to be efficiently and specifically expressed in microglia by using this vector, resulting in that an AAV vector that could efficiently and specifically express an exogenous gene in microglia of the central nervous system, was found.

15 Claims, 7 Drawing Sheets
Specification includes a Sequence Listing.

MICROGLIAL SELECTIVE GENE EXPRESSION VECTOR

TECHNICAL FIELD

This invention relates to an adeno-associated viral vector for selective gene expression in microglia.

BACKGROUND ART

In recent years, gene therapies using viral vectors have made rapid progress and have exhibited tremendous efficacy in multiple intractable diseases. Microglia, one type of glial cells in a central nervous system, have characteristics that attract neurodegenerative diseases and neuroinflammation, and are deeply associated with the pathological control of these diseases. Modification of the characteristics of the microglia or expression of therapeutic genes in microglia has been considered to be useful in the treatment of neurodegenerative diseases such as Alzheimer's and neuroinflammation such as multiple sclerosis.

So far, adeno-associated virus (AAV) vectors that are non-pathogenic and safe have been used for gene therapy of central nervous system diseases, however, the AAV vectors have a problem of very low affinity for microglia (Non Patent Literature 1), and there have been no AAV vectors that can efficiently and specifically express exogenous genes in microglia.

In Non Patent Literature 2, in order to express exogenous genes in striatal microglia, the lentiviral vector that expresses a target sequence (miR-9T) of the microRNA-9 (miR-9) under the control of a PGK promoter, has been used. However, when using the lentiviral vector that is a HIV-derived vector, was inferior in terms of safety due to the propensity thereof to incorporate a viral genome into a host cell genome. Furthermore, the lentiviral vector is relatively large (100 nm in diameter), limiting their spread within a brain parenchyma, resulting in insufficient gene transfection efficiency and specificity in the striatum.

On the other hand, Patent Literature 1 suggests that the ionized calcium-binding adaptor molecule 1 (Iba1) promoter sequences used enables microglia-selective gene expression, however, it does not report on gene transfection to target cells by using viral vectors or on microRNA target sequences. Moreover, Patent Literature 2 discloses an AAV vector comprising a microRNA target sequence, and the Iba1 promoter is also exemplified as a promoter, however, it does not suggest on microglia-selective gene expression and use of plural types of microRNA target sequences.

CITATION LIST

Patent Literature

[Patent Literature 1] Re-publication of PCT International Application No. 2005-090561
[Patent Literature 2] Japanese Patent No. 6422897

Non Patent Literature

[Non Patent Literature 1] Molecular therapy Methods & clinical development: 2016; 3; 16026
[Non Patent Literature 2] Nature commun.: 2013; 4; 1770
[Non Patent Literature 3] The Journal of Neuroscience: 2013; 33 (12); 5127-5137
[Non Patent Literature 4] Nature: 2016; 538; 388-391

SUMMARY OF INVENTION

Technical Problems

An object of the present invention is to develop an AAV vector that can efficiently and specifically express an exogenous gene in microglia of a central nervous system.

Solution to Problem

The present inventors have conducted diligent investigations in order to solve the problem described above. In the course of the investigations thereof, the present inventors first used an AAV vector and found that a target gene could not be expressed in microglia at all in the same gene configuration as when using the lentiviral vector of Non Patent Literature 2. Therefore, a promoter on the AAV vector was changed to an Iba1 promoter, and further a configuration that combined a miR-9 complementary sequence (miR-9T) was adopted, or the promoter on the AAV vector was changed to the Iba1 promoter, and further a configuration that combined the miR-9 complementary sequence (miR-9T) and a miR-129 complementary sequence (miR-129T) was adopted. By using these vectors, the present inventors have found that an exogenous gene could be efficiently and specifically expressed in microglia.

In view of these circumstances, an adeno-associated viral vector for selective gene expression in microglia has been completed.

Namely, the present invention is as follows:

[1] An adeno-associated viral vector for gene expression in microglia, comprising an expression unit comprising an Iba1 (ionized calcium-binding adaptor molecule 1) promoter and a complementary sequence of miR-9.
[2] The vector of [1], wherein the expression unit further comprises a complementary sequence of miR-129.
[3] The vector according to [1] or [2], further comprising a target gene arranged under the control of the Iba1 promoter.
[4] The vector according to [3], wherein the target gene is a green fluorescent protein (GFP) gene.
[5] The vector according to any one of [1] to [4], comprising each of a complementary sequence of miR-9 and/or a complementary sequence of miR-129 that is repeated a plurality of times.
[6] The vector according to any one of [1] to [5], further comprising a woodchuck hepatitis virus post-transcriptional regulatory element (WPRE) gene.
[7] The vector according to any one of [1] to [6], comprising a base sequence represented by SEQ. ID No. 1 or a base sequence that is at least 90% identical to the base sequence represented by SEQ. ID No. 1.
[8] The vector according to any one of [2] to [6], comprising a base sequence represented by SEQ. ID No. 2 or a base sequence that is at least 900/identical to the base sequence represented by SEQ. ID No. 2.
[9] A vector according to any one of [1] to [8], being combined for use with a vector for capsid gene expression.
[10] The vector according to any one of [1] to [9], being combined for use with a vector for gene expression responsible for a helper action of adenovirus.
[11] A recombinant virus obtained from the vector according to any one of [1] to [10].

[12] A medicament comprising the vector according to any one of [1] to [10] or the recombinant virus according to [11].

[13] The medicament according to [12] for the central nervous system disease.

[14] A method for transfecting a gene to a cell, comprising a step of transfecting a target gene into a target cell in vitro by using the vector according to any one of [1] to [10].

[15] The method according to [14], wherein the target cell is a central nervous system neuron.

[16] An isolated cell into which the vector according to any of [1] to [10] was transfected.

Advantageous Effects of Invention

An AAV vector that can efficiently and specifically express an exogenous gene in microglia of a central nervous system has been developed. Injection of this AAV vector into the central nervous system enabled microglia-specific expression of exogenous gene.

Therefore, the vector of the present invention is considered promising for basic research targeting microglia, preclinical studies of gene therapy, and gene therapy.

BRIEF DESCRIPTION OF DRAWINGS

In FIG. 1, Panel (a) illustrates a schematic diagram of the AAV genome containing the Iba1 promoter and GFP. Panel (b) illustrates a schematic diagram of the cerebral region where immunohistochemical staining was carried out. Panels (c) to (e) are photographs illustrating a large number of transduction to Iba1-negative non-microglial cells in the cerebral cortex comprising a small number of transduction to microglia (arrowhead). Panels (d) and (e) show enlarged photomicrographs of two square regions in (c), respectively. Panels (f) and (j) are schematically illustrated diagrams representing striatum and cerebellum site regions immunohistochemically stained, respectively, which are photomicrographs of striatums (g to i) and cerebellar cortices (k to m) immunohistochemically stained upon robust and efficient transduction to microglia, comprising weak and low density transduction to the Iba1-negative non-microglial cells (arrows). Two square regions in (g, k) are enlarged, respectively. The scale bars are 100 µm (c, g, k) and 20 µm (d, e, h, i, l, m). Panel (n) is a graph illustrating specificity of transduction to microglia in three brain regions [percentage of Iba1(+) cells in GFP (+) cells]. The abbreviations in the panels represent Cbm: cerebellar cortex, Ctx: cerebral cortex, GFP: enhanced green fluorescent protein, GL: granule cell layer, Iba1: ionized calcium-binding adaptor molecule 1, ITR: terminal inverted sequence. ML: molecular layer, poly A: polyadenylation signal, Str: striatum, WPRE: woodchuck hepatitis virus post-transcriptional regulatory element, respectively.

In FIG. 2, Panel (a) is a schematically illustrated diagram of AAV construct expressing GFP and 4×miR-9. T by the Iba1 promoter. Panel (b) is a schematically illustrated diagram of a cerebral site immunohistochemically stained. Panels (c) to (e) are photomicrographs of cerebral cortices immunohistochemically stained. Panels (d) and (e) are enlarged photomicrographs of the two square regions in Panel (c), respectively where in contrast to weak immunolabeling of non-microglial cells. GFP expression was strongly expressed in microglia. Panels (f) and (j) are schematically illustrated diagrams of the striatum and cerebellum sites immunohistochemically stained, respectively, which are photomicrographs of the striatums (g to i) and cerebellar cortices (k to m) immunohistochemically stained where most cells expressing GFP are found to be Iba1(+) microglia. The scale bars are 100 µm (c, g, k) and 20 µm (d, e, h, i, l, m). Panel (n) is a graph illustrating specificity of transduction to microglia in three brain regions [percentage of Iba1(+) cells in GFP (+) cells]. The abbreviations in the panels represent Cbm: cerebellar cortex, Ctx: cerebral cortex, GFP: enhanced green fluorescent protein, GL: granule cell layer, Iba1: ionized calcium-binding adaptor molecule 1, ITR: terminal inverted sequence, ML: molecular layer, poly A: polyadenylation signal, Str: striatum. WPRE: woodchuck hepatitis virus post-transcriptional regulatory element, respectively.

In FIG. 3, Panel (a) is a schematically illustrated diagram of the AAV construct comprising the quadruplex of complementary sequences of each of the Iba1 promoter, the fluorescent green dye (GFP) gene, as well as the miR-9 and the miR-129-2-3p. Panel (b) is a schematically illustrated diagram of a cerebral region immunohistochemically stained. Panels (c) to (e) are photomicrographs of cerebral cortices immunohistochemically stained. Panels (d) and (e) are enlarged photomicrographs of the two square regions in (c), respectively where in contrast to weak GFP expression in non-microglial cells (arrows) of Iba1-negative. GFP expression was strongly expressed in microglia. Panels (f) and (j) are schematically illustrated diagrams of the striatum and cerebellum sites immunohistochemically stained, respectively, which are photomicrographs of the striatums (g to i) and cerebellar cortices (k to m) immunohistochemically stained, exhibiting the highly efficient and specific GFP expression to microglia. Panels (h) and (i) are enlarged photomicrographs of the two square regions in (g), respectively. The scale bars are 100 µm (c, g, k) and 20 µm (d, e, h, i, l, m). Panel (n) is a graph illustrating the GFP expression efficiency of microglia in three brain regions one week after injection of the AAV9 vector of (a), where the proportion of microglia (labeled with Iba1) of the cells expressing GFP. The abbreviations in the panels represent Cbm: cerebellar cortex, Ctx: cerebral cortex, GFP: enhanced green fluorescent protein, GL: granule cell layer, Iba1: ionized calcium-binding adaptor molecule 1, ITR: terminal inverted sequence, ML: molecular layer, poly A: polvadenylation signal. Str: striatum, WPRE: woodchuck hepatitis virus post-transcriptional regulatory element, respectively.

In FIG. 4. Panels (a) and (b): One-way analysis of variance and Bonferroni posterior test, *: P=0.003, : P<0.001. Panel (c): Dunn post hoc test with Kruskal-Wallis test and Bonferroni adjustment for multiple comparisons, *: P=0.002.

In FIG. 5, the left panels, Panels(a) and (b) are confocal images of the signal of G-CaMP observed that was expressed in the granule cell layer of an acute cerebellar slice (photomicrographs) using the AAV vector created in this study where the regions of objects for analysis (ROIs 1 to 4) were set on the large compartment (microglial cell bodies or large projections thereof) represented by (a) and on the small compartment of microglia (microglial microscopic projections) represented by (b), respectively. The right panels of (a) and (b), respectively, show the $Ca^{2+}$ signal change estimated from the fluorescence of the ROI on the left panels. When 100 μM ATP (indicated by black bars) was perfused to act on the acute cerebellar slices, distinct $Ca^{2+}$ elevations were observed in both of the cell bodies and projections of G-CaMP7.09-expressing microglia. Panel (c) is the box-and-whisker diagram illustrating $Ca^{2+}$ elevation induced in microglia by ATP perfusion. $\Delta F/F_{basal}$ is based on an intracellular $Ca^{2+}$ concentration in the basal state and is a proportion of change in $Ca^{2+}$ concentration elevated by ATP administration, and the white circles indicate individual data points. The horizontal lines and boxes represent median values and interquartile ranges, respectively. The error bar indicates one standard deviation above or below the mean values (black circles). Panel (d) is time-lapse fluorescence images (photomicrographs) showing the movement of microglial projections (indicated by white circles) expressing G-CaMP7.09. Incidentally, in other G-CaMP-expressing microglial compartments outside the white circles, no change in the $Ca^{2+}$ signal was observed.

In FIG. 6, Panel (a) illustrates a flowchart of the experimental protocol where a liquid agent containing the AAV. Iba1. miR-9. T. miR-129-2-3p. T and LPS (0.2 μg/μl) was injected in three brain regions on day 0, then LPS (1.0 μg/body weight (g)) was injected intraperitoneally daily until day 7. Six hours after the LPS injection on day 7, mice were sacrificed, and acute brain slices were prepared and then double immunolabeled with GFP and Iba1. Panels (b) to (m) are photomicrographs of cerebral cortices (b to e), striatums (f to i) and cerebellar cortices (j to m) by fluorescence microscopy at low, medium, and high magnifications thereof where the square regions in (b), (f) and (j) are magnified in (c), (g) and (k), respectively. The scale bars: 500 μm (b, f, j), 200 μm (c, g, k) and 20 μm (d, e, h, i, l, m). Abbreviations in the panels are respectively as follows; GFP: enhanced green fluorescent protein (emits brighter fluorescence than normal). GL: granule cell layer, Iba1: ionized calcium-binding adaptor molecule 1, LPS: lipopolysaccharide, and ML: molecular layer.

In FIG. 7, Panels (a) to (c) are GFP immunofluorescence images of cerebellar sagittal sections of wild-type (WT) mice. Panels (d) to (f) are GFP immunofluorescence images of cerebellar sagittal sections from SCA1-Tg (B05) mice. The square regions in Panel (a) and (d) were enlarged to (b, c) and (e, f), respectively. The scale bars: 500 μm (a, b) and 20 μm (b, c, e, f).

DESCRIPTION OF EMBODIMENTS

Figure 1:
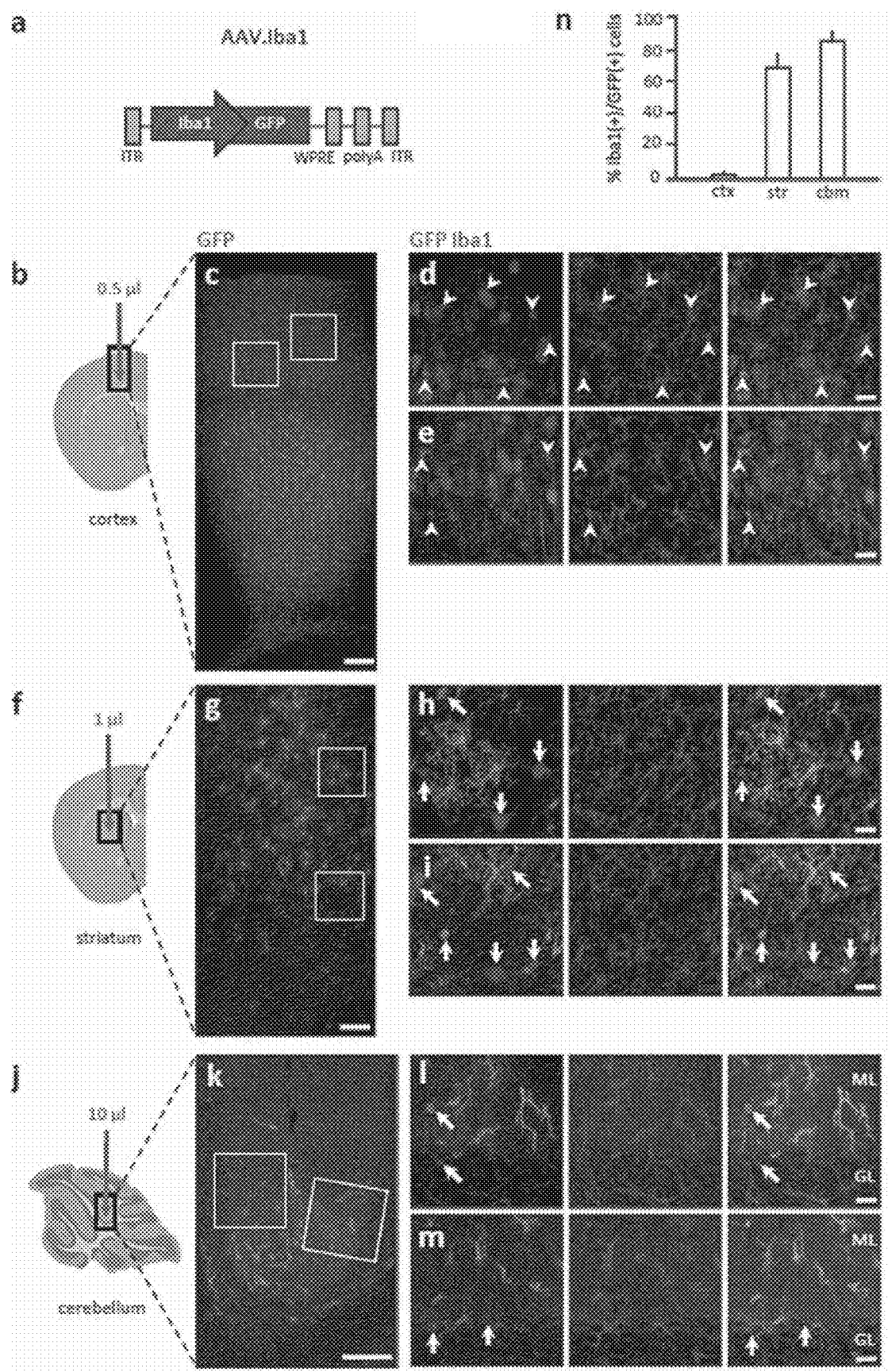
FIG. 1 shows microglia-selective transduction in a cerebral cortex, a striatum, and a cerebellar cortex by the vector incorporating the Iba1 promoter and the GFP gene into the AAV vector (hereafter also referred to as AAV. Iba1) where the AAV9 vector was injected into the mouse cerebral cortex (0.5 µL) striatum (1 µL), and cerebellar cortex (10 µL). One week after injection, brain sections were immunostained by GFP and Iba1.

The present invention is an adeno-associated viral vector for gene expression in microglia, comprising an expression unit comprising an Iba1 promoter and a complementary sequence miR-9. The expression unit can further comprise a complementary sequence of miR-129.

The expression unit of the AAV vector has inverted terminal repeat sequences (ITR) at both ends, which can refer to a region comprising them and the region sandwiched therebetween.

It is publicly known to those skilled in the art that there is a plurality of serotypes of adeno-associated viruses (AAV), and the serotype of AAV from which the AAV vector is derived in the present invention is not limited as long as it is capable of expressing a target gene in microglia. Namely, the portion other than the expression unit may be derived from any AAV, and for example, AAVs of serotype 9, serotype 1, and serotype 6 can be used. The AAV of serotype 9 (AAV9) is preferably used.

The Iba1 promoter that is promoters of the Iba1 genes of mammals such as human, mouse, and rat, can be used, and in each Iba1 gene, a region of approximately 500 bp, 1 kbp, 1.5 kbp, 2 kbp, or 3 kbp on the 5' side from the transcription start point, can be used. The base sequence of the Iba1 promoter is not particularly limited, and for example, a promoter having the base sequence represented by SEQ. ID No. 3 or 4 can be used. Alternatively, it may have a portion of the base sequence represented by SEQ. ID No. 3 or 4 alone as long as it can exhibit a function as the Iba1 promoter, or it may have a base sequence that is at least 90% identical to the base sequence represented by SEQ. ID No. 3 or 4, preferably a base sequence that is at least 95% identical thereto, and more preferably a base sequence that is at least 98% identical to the base sequence represented by SEQ. ID No. 3 or 4.

When the vector of the present invention is used for the purpose of treating humans, a promoter having the base sequence represented by SEQ. ID No. 4 is preferably used.

The AAV vector of the present invention can comprise a target gene that is under the control of the Iba1 promoter. i.e., the target gene linked to the Iba1 promoter.

A type of target gene linked to the Iba1 promoter is not particularly limited, and marker genes such as a GFP gene (comprising modified types), a Cre recombinase gene, luciferase, chloramphenicol acetyltransferase, and lacZ, a protein gene that senses production of intracellular second messengers such as $Ca^{2+}$ and cyclic AMP and emits fluorescent light, a light-activated protein gene, and a toxin gene, can be exemplified. In addition, it may a gene used in the treatment of central neuropathic diseases.

An example of the GFP gene is shown in SEQ. ID No. 5.

The gene that has a therapeutic effect against central neuropathic diseases can be selected according to the type of diseases to be treated. For example, in the case of multiple sclerosis, a nucleic acid that encodes factors or elements that can inhibit inflammation of brain parenchyma can be used. Moreover, a nucleic acid encoding anti-inflammatory cytokines that attenuate brain injury or a nucleic acid encoding the brain-derived (BDNF) or glial cell-derived neurotrophic factor (GDNF) is comprised.

The AAV vector of the present invention may be such that these target genes were preliminarily under the control of the Iba1 promoter, or a multicloning site for incorporating these target genes is arranged downstream of the Iba1 promoter.

The vector of the present invention comprises the complementary sequence of miR-9. Further, it may contain the complementary sequence of miR-129. They may be base sequences complementary to miR-9 and miR-129, respectively, which can be present in the cells into which the vector of the present invention is to be transfected, and each base sequence is not particularly limited, and for example, the complementary sequence of miR-9 is the sequence represented by SEQ. ID No. 6, and the complementary sequence of miR-129 is the sequence represented by SEQ. ID No. 7. Alternatively, each of these microRNAs may have, as long as it can exhibit the function thereof, a sequence that is at least 90%/o identical to the base sequence represented by SEQ. ID No. 6 or 7, preferably, a base sequence that is at least 95% identical thereto, and more preferably a base sequence that is at least 98% identical to the sequence represented by SEQ. ID No. 6 or 7.

The complementary sequence of the microRNA gene is used for degrading mRNA that was transcribed from the AAV vector of the present invention in cells other than microglia. In other words, miR-9 and miR-129 are both expressed in astrocytes and neurons, and therefore miR-9 and miR-129 bond to the complementary sequences thereof in the astrocytes and neurons to degrade mRNAs, however, microRNA is not expressed in the microglia, thereby enabling to express mRNA only in microglia.

Since the vector of the present invention is a gene-modified vector that is basically composed of the AAV vector, it infects not only microglia but also neurons and astrocytes as in the case of the AAV vector.

The Iba1 promoter is a promotor having high selectivity for microglia and has a promotor activity in neurons and astrocytes as well. Thus, by using the vector of the present invention, miR-9T and miR-129-2-3p T are also transcribed in the neurons and astrocytes.

The important thing here is that miR-9 and miR-9 miR-129-2-3p are originally present in neurons and astrocytes, however, in microglia, few of these each microRNA (miR-9 and miR-129-2-3p) are present. Namely, even though exogenous genes (miR-9T and miR-129-2-3pT are added) transfected by the vector of the present invention are transcribed in neurons and astrocytes, miR-9 and miR-129-2-3p that are originally present in the neurons and astrocytes bond to miR-9T and miR-129-2-3pT comprised in mRNA transcribed from the AAV vector of the present invention, then degrading mRNA. On the other hand, miR-9 and miR-129-2-3p are not present in microglia, mRNA of the transfected exogenous gene is not degraded, then enabling the target exogenous gene to be expressed.

The vector of the present invention may comprise each of the miR-9 complementary sequence and/or the miR-129 complementary sequence that is repeated a plurality of times. Comprising each of the complementary sequences repeated a plurality of times is not particularly limited, and it is preferably two to six times each, more preferably four to six times, and particularly preferably four times each. The number of times of the miR-9 complementary sequence repeated and the number of times of the miR-129 complementary sequence repeated may be the same or different, respectively. The miR-9 complementary sequence and the miR-129 complementary sequence may be alternately arranged.

The vector of the present invention may further comprise a woodchuck hepatitis virus post-transcriptional regulatory element (WPRE) gene.

WPRE prevents read-through of the poly A site, promotes RNA processing and maturation, and has a function of increasing RNA transportation out of nucleus thereof. WPRE also functions to promote vector packaging by acting on the viral genomic transcript in packaging cells, allowing the viral titer to be increased. Moreover, WPRE promotes the maturation of mRNA produced by the internal promoter of the vector and therefore has a function of enhancing the expression of target genes in transfected target cells.

The vector may contain a selection marker. The "selection marker" is referred to as a genetic element that provides a selectable phenotype for the cell into which the selection marker was transfected and is generally a gene imparting resistance for the chemical reagent in which a gene product inhibits cell growth or kills cells. Specifically, for example, Neo genes, Hyg genes, hisD genes, Gpt genes, and Ble genes are comprised. Drugs useful for selecting the presence of the selection marker comprise, for example, G418 for Neo, hygromycin for Hyg, histidinol for hisD, xanthine for Gpt, and bleomycin for Ble.

In the vector of the present invention, the order of the above genes and the binding sequences between the above genes are not limited provided that the genes to be incorporated into the AAV vector as described above are functionally linked to each other, however, the genes are preferably arranged in the order of promoter, target gene, and miR complementary sequence from the 5' side.

The vector of the present invention may comprise other functional genes. For example, it comprises an enhancer and poly A.

The vector of the present invention is not particularly limited, and is, for example, a vector comprising the base sequence represented by SEQ. ID No. 1 or 2. The base sequence represented by SEQ. ID No. 1 comprises four repeated sequences of the Iba1 promoter, WPRE, and miR-9 complementary sequence. Moreover, the base sequence represented by SEQ. ID No. 2 comprises four repeated sequences of the Iba1 promoter, WPRE, and the miR-129 complementary sequence, and four repeated sequences of the miR-9 complementary sequence.

The vector of the present invention may be a vector composed of the base sequence represented by SEQ. ID No. 1 or 2 alone, or it may be a vector further comprising a base sequence other than that represented by SEQ. ID No. 1 or 2. Further, provided that the promoter, the target gene, and the miR complementary sequence are functional, the vector may be a vector comprising a base sequence that is at least 90% identical to the base sequence represented by SEQ. ID No. 1 or 2, it may be preferably a vector comprising a base sequence that is at least 95% identical to the base sequence represented by SEQ. ID No. 1 or 2, and even more preferably a vector comprising a base sequence that is 98% identical to the base sequence represented by SEQ. ID No. 2.

The length of the expression unit is usually up to about 4.7 kbp and up to about 7.5 kbp as the entire AAV.

The method for incorporating the various genes above into the AAV vector sequence can be carried out by methods publicly known to those skilled in the art. Although not particularly limited, for example, various genes can be incorporated into the vector sequence by a method using restriction enzyme treatment.

As a gene transfection method, a method using publicly known AAV vectors can be employed.

Specifically, into packaging cells such as HEK293 cells are a transfected pAAV plasmid, a pRC plasmid, or a helper plasmid to form viruses, and the resulting viruses then infect target brain cells, preferably glial cells, more preferably microglial cells.

In order to protect the target gene from being degraded by a degrading enzyme, the vector of the present invention may be combined for use with a vector for capsid expression. The capsid comprises, for example, an AAV9 capsid, an AAV1 capsid and an AAV6 capsid. When the AAV vector used is the AAV9 vector, the AAV9 capsid is preferred for use.

The vector of the present invention may be combined for use with a vector for gene expression, responsible for a helper action of adenovirus.

The gene responsible for the helper action is not limited provided that it is responsible for the helper action of adenovirus, and comprises, for example, E1A, E1B, E2A, E2B, E3, E4, VA, and the like. Among these genes, one or more thereof may be comprised.

The helper action is not limited to those publicly known to those skilled in the art, and is, for example, E1A enhancing transcription activity or the like, E1B having regulation activity of apoptosis or the like, and E2A and E2B having DNA replication activity or the like.

Another aspect of the present invention is medicament comprising any of the above vectors or recombinant viruses obtained therefrom.

The medicament comprise gene therapeutic agents for diseases of the central nervous system and diseases in which microglia are abnormal.

Although the diseases are not particularly limited provided that they involve microglia, they are preferably medicament for the central nervous system disease. The central nervous system disease comprises, for example, neurodegenerative diseases such as Alzheimer's disease and neuroinflammation such as multiple sclerosis.

The amount of active ingredients in the medicament is not particularly limited provided that the therapeutic effect can be obtained and can be appropriately determined according to the type of disease, degree of disease, patient age, body weight, expression efficiency, or the like.

The administration and dosage of the medicament of the present invention are not particularly limited provided the therapeutic effect can be obtained and can be appropriately determined according to the type of disease, degree of disease, patient age, body weight, expression efficiency, or the like.

The medicament of the present invention may contain other active ingredients, and may be combined for use with, for example, therapeutic agents for treatment of diseases of the central nervous system.

Other aspect of the present invention is a method for transfecting any of the above vectors into a target cell in vitro. However, a method for transfecting any of the above vectors into the target cell in non-human animals in vivo is also comprised.

The target cell into which the above vector is transfected is preferably a central nervous system cell, more preferably microglia, and particularly preferably microglia of a cerebral cortex.

The method for transfecting the vector into the target cell is not particularly limited, however, is preferably a method based on the infection ability that the AAV vector inherently possesses.

Other aspect of the present invention is an isolated cell, transfected with any of the above vectors. It is preferably a brain cell into which the above vector was transfected, preferably a glial cell, and more preferably a microglial cell.

EXAMPLES

The present invention will be described in more detail by way of the following Examples, however, it goes without saying that the scope of the invention is not limited only to the Examples.
<Method>
Vector Construction A target sequence was designed based on the microRNA sequences obtained from the miRNA Registry (www.mirbase.org). In order to construct an AAV. PGK. miR-9. T vector, the oligonucleotide with the corresponding sense 1 to 2 (S1 to S2, SEQ. ID Nos. 8 to 9) and antisense 1 to antisense 2 (AS1 to AS2, SEQ. ID Nos. 10 to 11) was annealed and inserted into the KpnI and BamHI restriction enzyme sites in 3'UTR of the transgene expression cassette of the AAV. PGK vector. In order to construct an AAV. PGK. miR-9. T. miR-129-2-3p. T or AAV. PGK. miR-9. T. miR-136-5p. T vector, the oligonucleotide with sense 1 to sense 4 (S1 to S4, SEQ. ID Nos. 12 to 15 and SEQ. ID Nos. 20 to 23) and antisense 1 to antisense 4 (AS1 to AS4, SEQ. ID Nos. 16 to 19 and SEQ. ID Nos. 24 to 27) was annealed and inserted into the KpnI and BamHI restriction enzyme sites in 3'UTR of the GFP expression cassette of the AAV. PGK vector.

As the Iba1 promoter, the genomic region of 1,678 bp upstream (5' side) of the first ATG in exon 1 of the mouse Iba1 gene was used. The Iba1 promoter region was amplified from the mouse brain cell-derived genomic DNA by two-step (nested) PCR For the first step of DNA amplification, Iba1-nest-F (5'-CCTAGAGCCATCTTGTAAGG-3', SEQ. ID No. 28) and Iba1-nest-R (5'-CGAGGAATTGCTGTTGAG-3', SEQ. ID No. 29) were used, and for the second step of DNA amplification, Iba1-F (5'-ATGCTCTAGActcgagTACTATAGGATGCATCGTGAAAACC-3', SEQ. ID No. 30) and Iba1-R (5'-CATGGTGGCGaccggtGGCTCCTCAGACGCTGGTTG-3', SEQ. ID No. 31) were used.

AAV. Iba1. miR-9. T, AAV. Iba1. miR-9. T. miR-129-2-3p. T, or AAV. Iba1. miR-9. T. miR-136-5p. T was obtained by replacing the PGK promoter in the AAV vector constructed above with the Iba1 promoter. Namely, the PGK promoter in the corresponding AAV. PGK vector was replaced with the cloned 1.7 kb mouse Iba1 promoter in the XhoI and AgeI restriction enzyme sites.
Preparation of AAV9 Vector To the HEK293T cell were simultaneously transfected three plasmids: a pRC expression plasmid, a pHelper (Stratagene, La Jolla, CA, USA), and pAAV9 to prepare AAV9 vector particles. As described above, the virus particles were precipitated by ammonium sulfate or a polyethylene glycol 8000 and purified by continuous gradient centrifugation with iodixanol. The genomic titer of the purified AAV9 vector wt± as determined by quantitative real-time PCR using THUNDERBIRD (trademark) SYBR® qPCR Mix (TOYOBO Co., Ltd.) by targeting the WPRE sequence with a primer 5'-CTGTTGGGCACTGACAATTC-3' (SEQ. ID No. 32) and 5'-GAAGGGACGTAGCAGAAGGA-3' (SEQ. ID No. 33). An expression plasmid vector was used as standard. The enriched vector expression titer was in the range from $2.55 \times 10^{13}$ to $2.32 \times 10^{14}$ vg/ml.

Animals

C57BL/6J mice (4 to 5 weeks old) and SCA1 transgenic mice (28 to 29 weeks old) were used in the present study. All animal procedures were conducted in accordance with protocols approved by the Japanese Act on the Welfare and Management of Animals and the Guidelines for Proper Conduct of Animal Experiments issued by the Science Council of Japan.

Stereotactic Injection of AAV9 Vector Into Brain Parenchyma

Mice were anesthetized by intraperitoneal injection of ketamine (100 mg/body weight (kg)) and xylazine (10 mg/body weight (kg)). Depth of anesthesia was monitored by toe pinch reflex throughout the operation, and additional ketamine and xylazine were injected if necessary. A burr hole was made over each injection site to expose the brain. The AAV vector (AAV. PGK. miR-9. T. AAV. Iba1. miR-9. T, AAV. Iba1. miR-9. T. miR-129-2-3p. T, or AAV. Iba1. miR-9. T. miR-136-5p. T) was injected into the cerebral cortices, striatums and cerebella of mice. In order to reduce the inoculation volume and increase the precision, a 10 µl Hamilton syringe with a 33 G needle was used for injection. The following stereotactic coordinates were used for viral vector injection: cerebral cortex. AP −1.0 mm, ML+1.5 mm. DV+0.9 mm; striatum, AP −1.0 mm. ML+1.75 mm, DV+2.75 mm; cerebellum, AP+6.5 mm, ML 0 mm, DV 2.0 mm (all values are relative to the bregma). The AAV volume injected into each mouse brain (titer: $1.4 \times 10^{13}$ vg/ml) and the injection rate are, respectively: in the cerebral cortex, 0.5 µl, 10 nl/min; in the striatum, 1 µl, 20 nl/min; and in the cerebellum, 10 µl, 200 nl/min.

Immunohistochemistry

Mice had 0.1 M PBS (pH 7.4) containing 4% paraformaldehyde perfused through the hearts, and the extracted brains were fixed for another 8 hours and transferred into 1×PBS solution. Using a microtome (VT1000S, Leica, Germany), the brains were sliced into 50 µm thick coronal slices (cerebral cortices and striatums) or sagittal slices (cerebella). The slices were treated with a blocking solution (5% normal donkey serum, 0.5% Triton X-100, and 0.05% $NaN_3$ in PBS) for one hour, followed by the reaction overnight at 4° C. together with the primary antibody: rat anti-GFP (Nacalai Tesque, Inc.) 1:1,000, rabbit anti-Iba1 (Wako Pure Chemical Industries, Ltd.) 1:500. After washing three times with PBS for 15 minutes, the slices were incubated at 4° C. together with the following Alexa Fluor 488 or Alexa Fluor 594-conjugated secondary antibody (Thermo Fisher Scientific Inc.): Alexa Fluor 488 donkey anti-rat IgG 1:1,000, Alexa Fluor 594 donkey anti-rabbit IgG 1:1,000. Finally, the slices were rinsed three times with PBS and ProLong Diamond Antifade Mountant (Thermo Fisher Scientific Inc.) was used for encapsulation.

Confocal Laser Microscopy Analysis

The proportion of myeloid cells in the brain transduced by the AAV vector was investigated by immunohistochemistry. 50 µm thick sections were prepared from the cerebral cortex, striatum, and cerebellum, and double immunostained with the antibodies against GFP and Iba1. A series of 30 consecutive optical sections (total thickness 15 µm) at 0.5 µm intervals (field of view: 25,513.67 µm²) were photographed with a confocal laser scanning microscope using a 40×/0.95 NA objective lens (LSM800, Carl Zeiss A G, Oberkochen, Germany). Subsequently, the image processing software (ZEN blue) was used to conduct maximum-intensity projection (MIP). From each brain slice, 32 MIP images were captured without being overlapped (total 816,386.42 µm²), and the number of GFP-expressing myeloid cells was counted. The GFP positive cells co-labeled with Iba1 were considered brain myeloid cells. Three brain slices per mouse were analyzed in five mice. At least 500 cells were counted.

Measurement of $Ca^{2+}$ dynamics of microglia expressing G-CaMP and confocal microscopic analysis Confocal $Ca^{2+}$ imaging from acute cerebellar slices was conducted by using a slightly modified method described in the previous literature. Parasagittal slices (200 to 250 µm thick) of the cerebellar worm area were prepared by using a vibroslicer (VT1200S, Leica Microsystems, Germany) and bubbled with 95% $O_2$ and 5% $CO_2$ at room temperature for at least 1 hour in a solution containing 125 mM NaCl, 2.5 mM KCl, 2 mM $CaCl_2$, 1 mM $MgCl_2$, 1.25 mM $NaH_2PO_4$, 26 mM $NaHCO_3$, and 20 mM D-glucose (artificial cerebrospinal fluid: ACSF), and then the recording was begun.

G-CaMP7.09 is a recently developed $Ca^{2+}$-sensitive molecule that enhances fluorescence thereof accompanying an increase in intracellular $Ca^{2+}$ concentration. In order to record $Ca^{2+}$ signals from G-CaMP7.09-expressing cells, a high-speed rotating disk confocal unit (CSU-X1, Yokogawa Electric Corporation, Tokyo, Japan) attached with a 40× water immersion objective lenz (LUMPLFLN 40XW, OLYMPUS CORPORATION, Tokyo), a water-cooled CCD camera (iXon3 DU-897E-CS0-#BV-500, Andor Technology Ltd., Northern Ireland, Belfast) and an upright microscope (BX51WI, OLYMPUS CORPORATION, Tokyo) was used to obtain a confocal fluorescence image (exposure time 200 to 300 ms, 512×512 pixels, no binning) every two seconds. A 488-nm light beam from a diode laser module (Stradus 488-50, Vortran Laser Technology (VORTRAN), a Light Source Systems, Inc., USA) was used for excitation, and the emitted fluorescence was passed through a band (500 to 550 nm) filter to focus the light. During recording, cerebellar slices were maintained at room temperature and perfused with ACSF solution.

In order to evoke an increase in intracellular $Ca^{2+}$ in microglia, a 100 µM ATP dissolved in ACSF was acted extracellularly. Andor iQ2 (Andor Technologies Ltd.), NIH imageJ, and Igor Pro8 (WaveMetrics, Inc.) and custom-made programs were used for image processing and analysis. Since each measurement took 10 to 20 minutes, image drift (translational drift) was occasionally observed. In these cases, the drift images were processed and corrected using an image stabilizer plug-in for ImageJ provided by K. Li (http://www.cs.cmu edu/~kangli/code/Image_Stabilizer.html). The fluorescence at time t for each pixel was first subtracted from the background, and the relative increase in fluorescence due to increased intracellular $Ca^{2+}$ was measured by calculation of $\Delta F/F_{basal}$ where the $F_{basal}$ is basal fluorescence intensity averaged in the frame before stimulus (frame before ATP application), and $\Delta F = F_1 - F_{basal}$. The background fluorescence was obtained from the region without the cell structures in the same frame. The mean values of $\Delta F/F_{basal}$ in each region of object for analysis (ROI) was calculated in each frame. ROI was set to the cell structure expressing G-CaMP. Since it cannot be determined whether a plurality of adjacent ROIs in a frame is on the same cell or on other different cells, each ROI was referred to as a microglial cell compartment. Since the microglial projection is usually within two to three hundred micrometers, $Ca^{2+}$ imaging data were collected from 12 different field of view regions separated by 300 μm or more in five slices obtained from two mice. Thus, $Ca^{2+}$ imaging data were those obtained from a dozen microglia or more. In order to quantify an ATP induced $Ca^{2+}$ signal in the G-CaMP expressing cells, the peak amplitude of the $\Delta F/F_{basal}$ was measured in a time frame of 120 seconds after ATP application onset.

Statistical Analysis

Nonparametric Kruskal-Wallis test was used, followed by use of Steel-Dwas test (SPSS 22.0 J version 2.0.1) for statistical analysis. When $P<0.05$, it was considered statistically significant.

Comparative Example 1: Microglial Targeting in Striatum and Cerebellar Cortex by AAV9 Vector Incorporating Iba1 Promoter Since the AAV vector comprising the cell type-specific promoters such as a glial fibrillary acidic protein (GFAP) promoter (astrocyte) (PloS one 11, e0162023 (2016)), a neuron-specific enolase (NSE) promoter (neuron) (Cerebellum (London, England) 16, 913-922 (2017)), and an L7-6 promoter (cerebellar Purkinje cell) (Molecular therapy. Methods & clinical development 6, 159-170 (2017)), enabled the specific cell population to be targeted, it was conjectured that a microglia-specific promoter could be used to create a microglia-specific AAV vector that specifically expresses an exogenous gene in microglia. The 1.9 kb Iba1 genomic region comprising exon 1, intron 1, and a portion of exon 2 was used to prepare microglia-specific transgenic mice (Journal of neuroscience research 81, 357-362 (2005)), and whether or not the similar region (the 1,678 base pair genomic region upstream of the first ATG of the Iba1 gene) when incorporated into the AAV vector would play a role of the microglia-specific promoter, was investigated.

The AAV9 vector expressing an enhanced green fluorescent protein (GFP) by the Iba1 promoter (AAV. Iba1) (FIG. 1a) was injected into the cerebral cortices, striatums, and cerebellar cortices (FIGS. 1b, 1f, 1j). Immunohistochemistry of the striatums and cerebellar cortices one week after the injection demonstrated many transduced microglia (GFP and Iba1 double positive cells) (FIGS. 1g to 1i and k to m), however, some Ib1-negative non-microglial cells (arrows in FIGS. 1h, 1i, 1l, and 1m) were also observed. In contrast, the majority of GFP-expressing cells in the cortices were Iba1-negative pyramidal neuron-like cells (FIGS. 1c to 1e). Quantitative analysis demonstrated the ratio of GFP and Iba1 double positive cells (microglia) to GFP positive cells of 2.1±1.3% (cerebral cortices; 59 cells of 2,791 GFP-positive cells, n=5 mice), 68.8±9.6% (striatums; 1,808 cells of 2,628 GFP-positive cells, n=5 mice), and 85.7±5.5% (cerebellar cortices 2,244 cells of 2,618 GFP positive cells, n=5 mice) (FIG. 1n). From these results, the AAV. Iba1 was found to enable transduction with high efficiency for resident microglia in the striatums and cerebellar cortices, but little in the cerebral cortices.

Comparative Example 2: Non-Selective Transduction by AAV. PGK. miR-9. T

When the lentiviral vector expressing four repeated copies of miR-9. T by the PGK promoter was injected into the striatums of adult rats, about 75% of the transduced cells were found to be microglia expressing Iba1, as confirmed by the immunohistochemistry (Nature communications 4, 1770 (2013)). Therefore, in order to verify whether similar results could be observed for the AAV vector instead of the lentiviral vector, an AAV9 vector incorporating essentially the same transgene cassette as the lentiviral vector composed of the PGK promoter, GFP and four complementary miR-9 sequences (AAV. PGK. miR-9. T), was prepared and injected into the cerebral cortices. striatums, and cerebellar cortices of adult mice. One week after injection, brain slices were prepared and double immunolabeled with the antibodies against GFP and Iba1. As a result, the GFP-expressing cells were found in all three regions studied, indicating that some of these exhibited Iba1 positive. However, the majority of GFP-expressing cells could not be co-immunolabeled with Iba1 and were not considered microglia. The ratios of the Iba1-positive cells to the GFP-positive cells in the cerebral cortices, striatums, and cerebellar cortices are, respectively, 10.2±3.7% (319 cells out of 2,656 GFP-positive cells, n=5 mice), 7.4±3.4% (191 cells out of 2,576 GFP positive cells, n=5 mice), and 34.4±10.8% (901 cells out of 2,620 GFP-positive cells, n=5 mice) (data not shown). These results indicated that the selective targeting to microglia was difficult with the AAV. PGK. miR-9. T.

Figure 2:
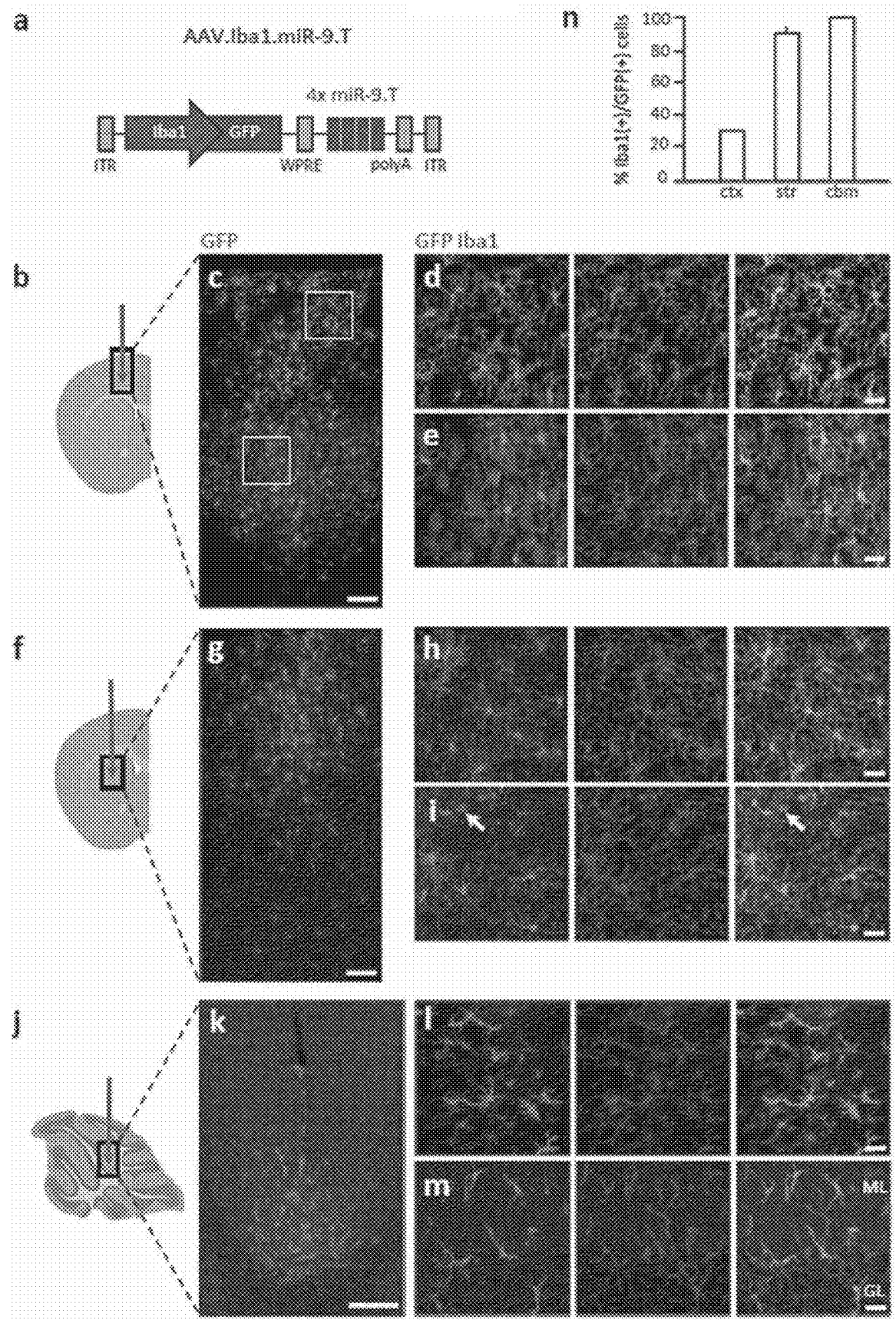
FIG. 2 shows microglia-selective transduction in the cerebral cortex, the striatum, and the cerebellar cortex by the vector incorporating the Iba1 promoter and the miR-9 complementary sequence (miR-9T) in the AAV vector (hereafter also referred to as AAV. Iba1. miR-9. T) where when the Iba1 promoter and the miR-9T are combined, the non-microglial cells in the cerebral cortex are partially de-targeted. Mouse brains one week after injection of the AAV vector were double immunostained with GFP and Iba1.

Example 1: Combination of the Iba1 Promoter with miR-9. T Sequence Increases Efficiency of Microglia Targeting As shown in FIG. 2a, four miR-9. T sequences were added to the downstream of WPRE of the AAV Iba1 expressing GFP. The viral vector (AAV. Iba1. miR-9. T) was injected into the three brain regions, and the injected brains were analyzed in a similar manner by immunohistochemistry. Microglia clearly expressing GFP were observed in all three brain regions (FIGS. 2b to 2m). In the cerebral cortex, microglia-selective transduction was observed in the region distant from the site of virus injection (FIGS. 2c, d), however, in the circumferential site of virus injection, the transduction into the majority of Iba1-negative non-microglial cells characteristic of large cell bodies was observed (FIGS. 2c, 2e). Quantitative analysis demonstrated that the ratios of Iba1 positive cells to GFP positive cells were 27.3±2.4% (cerebral cortex; 753 cells out of 2760 GFP-positive cells; n=5 mice), 94.0±2.0% (striatum; 2,663 out of 2,833 GFP-positive cells, n=5 mice), and 100±0% (cerebellar cortex; 2,726 cells out of 2,726 GFP-positive cells, n=5 mice) (FIG. 2n). Thus, the addition of four miR-9. T sequences to the AAV. Iba1 (AAV. Iba1. miR-9. T) enabled the expression of exogenous genes into the microglia in three brain regions, however de-targeting of cells excluding the microglia in the cerebral cortex remained inadequate, not enabling microglia-selective transformation.

Figure 3:
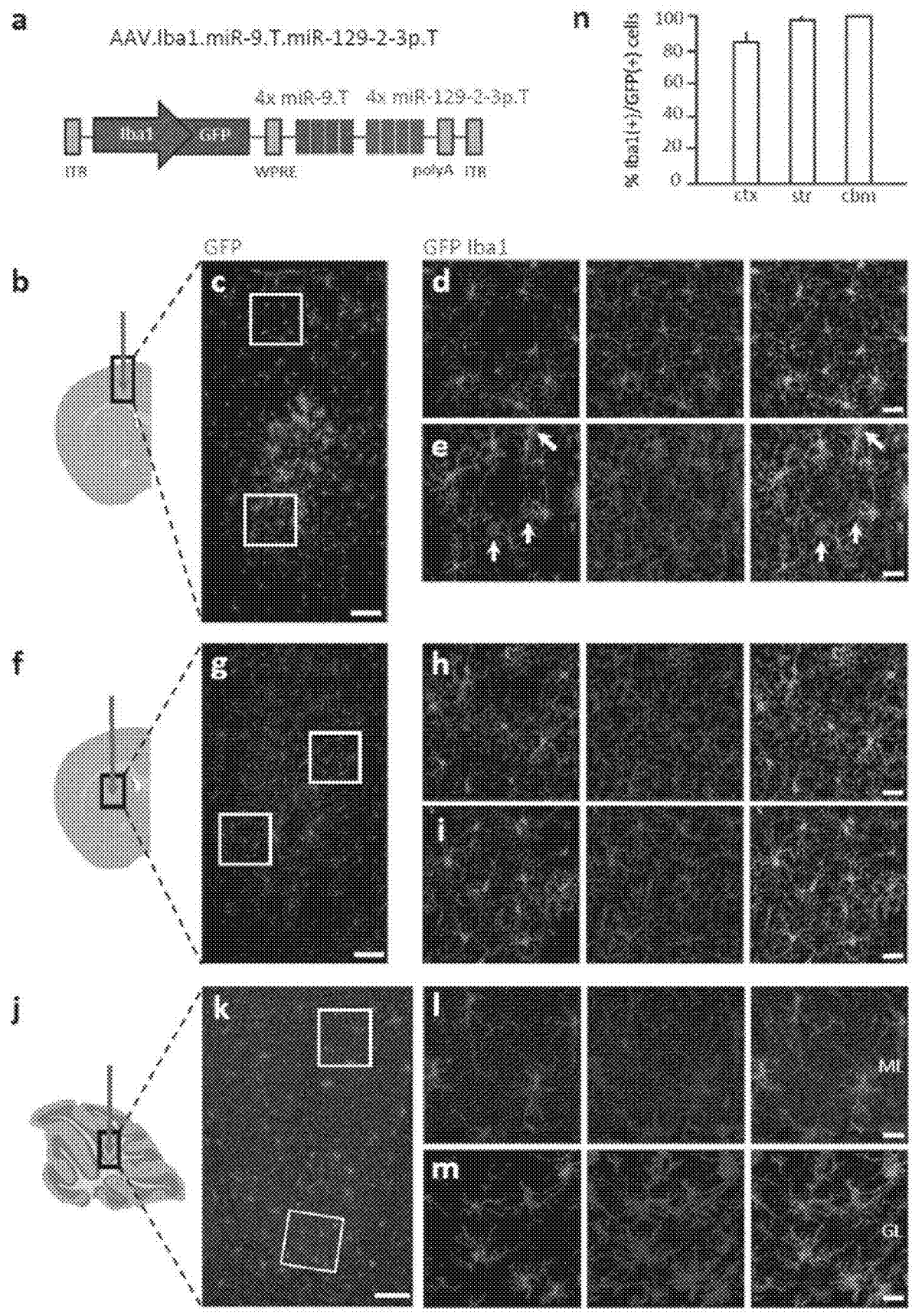
FIG. 3 shows highly efficient and specific microglial targeting by the vector incorporating the Iba1 promoter, the miR-9 complementary sequence (miR-9T), and miR-129 complementary sequence (miR-129T) in the AAV vector (hereafter referred to as AAV. Iba1. miR-9. T. miR-129-2-3p. T).

Example 2. De-Targeting from Neuron by Adding miR-129-2-3p. T to AAV. Iba1. miR-9. T Incorporation of the Iba1 promoter and miR-9. T to the AAV9 vector was effective in microglial targeting, however, was still insufficient to inhibit transgene expression of non-microglial cells, particularly in the cerebral cortex. In order to promote degradation of mRNA transcribed from the transgene in the non-microglial cells, in addition to a quadruplex miR-9. T, an additional quadruplex micro RNA-129-2-3p target (miR-129-2-3p. T) sequence (FIG. 3a) (AAV. Iba1. miR-9. T. miR-129-2-3p. T) or a microRNA-136-5p target (miR-136-5p. T) sequence was incorporated (AAV. Iba1. miR-9. T. miR-136-5p. T) (data not shown). Similar to miR-9, miR-129-2-3p and miR-136-5p are both reported to be abundant in a neuron, while the expression thereof in microglia is minimal (Non Patent Literature 3). Thus, in the neuron, they are considered to degrade the transgene mRNAs comprising the complementary target sequence of the miR-129-2-3p or miR-136-5p. The AAV. Iba1. miR-9. T. miR-129-2-3p. T or AAV. Iba1. miR-9. T. miR-136-5p. T was injected in a similar manner in three different brain regions (cerebral cortex, striatum, and cerebellar cortex) and analyzed immunohistochemically one week later. The results demonstrated that the brain slices into which AAV. Iba1. miR-9. T. miR-129-2-3p. T was injected exhibited microglia-specific transduction in all three brain regions (FIGS. 3b to 3m). Quantitative analysis demonstrated that the ratios of Iba1 positive cells to GFP positive cells were 86.5±5.6% (cerebral cortex; 2750 cells out of 3180 GFP positive cells: n=5 mice), 99.6±0.46% (striatum; 3127 cells out of 3140 GFP positive cells, n=5 mice), and 100.0% (cerebellar cortex, 2712 cells out of 2712 GFP positive cells n=5 mice) (FIG. 3n).

Contrary to the case of having added miR-129-2-3p. T to AAV. Iba1. miR-9. T, the case of having added miR-136-5p. T to AAV. Iba1. miR-9. T resulted in de-targeting of the non-microglial cells in the cerebral cortex to be unsuccessful (data not shown).

Figure 4:
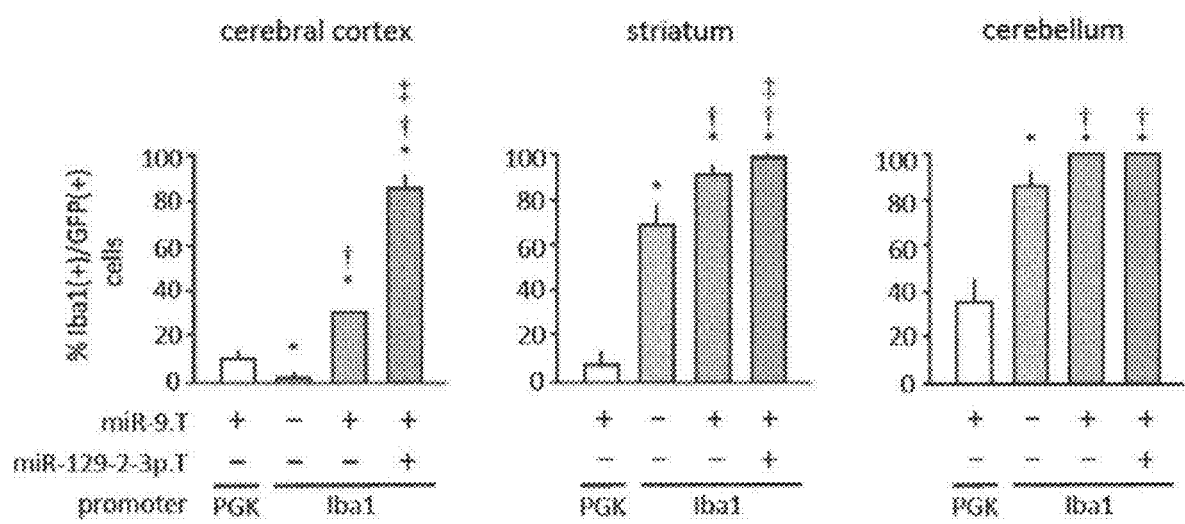
FIG. 4 is diagrams each illustrating the GFP expression efficiency of microglia by the AAV vector in three separate brain regions (the results from FIGS. 1 to 4 are summarized.). As illustrated, mice had the AAV9 vector expressing GFP injected together with GFP alone or microRNA in each cerebral cortex (a), striatum (b), or cerebellum (c) under the control of the Iba1 promotor or the phosphoglycenate kinase (PGK) promoter that is a housekeeping gene.

Thus, as summarized in FIG. 4, the addition of miR-129-2-3p. T to AAV. Iba1. miR-9. T (AAV. Iba1. miR-9. T. miR-129-2-3p. T), compared to the use of AAV. PGK. miR-9. T. the AAV. Iba1, and the AAV. Iba1. miR-9. T, enabled significant enhancement of the non-microglial de-targeting in the cerebral cortex and achieved highly specific transduction for resident microglia in the cerebral cortex, striatum, and cerebellar cortex.

There are various types of microRNAs, and the expression levels of the microRNAs are known to vary depending on the cell types. Particularly, in microglia, not only microRNA-9 (miR-9) and microRNA-129 (miR-129), but also miR-124, miR-127, miR-135, miR-136, miR-137, miR-153, miR-204, miR-325, miR-335, miR-384, and the like also have been known to have low expression levels (Non Patent Literature 3). The present inventors have found that the combination of microRNA-9 (miR-9) and micro RNA-129 (miR-129) is important for microglia-specific gene expression among them.

By using the vector of the present invention, it is possible to express exogenous genes in microglia in an extremely efficient and specific manner. Specifically, when the vector of the present invention is injected into a cerebellum or striatum, almost 100% of the cells expressing the exogenous gene is microglia, and when the vector is injected into the cerebral cortex, approximate 85% of the cells expressing the exogenous gene is microglia.

Figure 5:
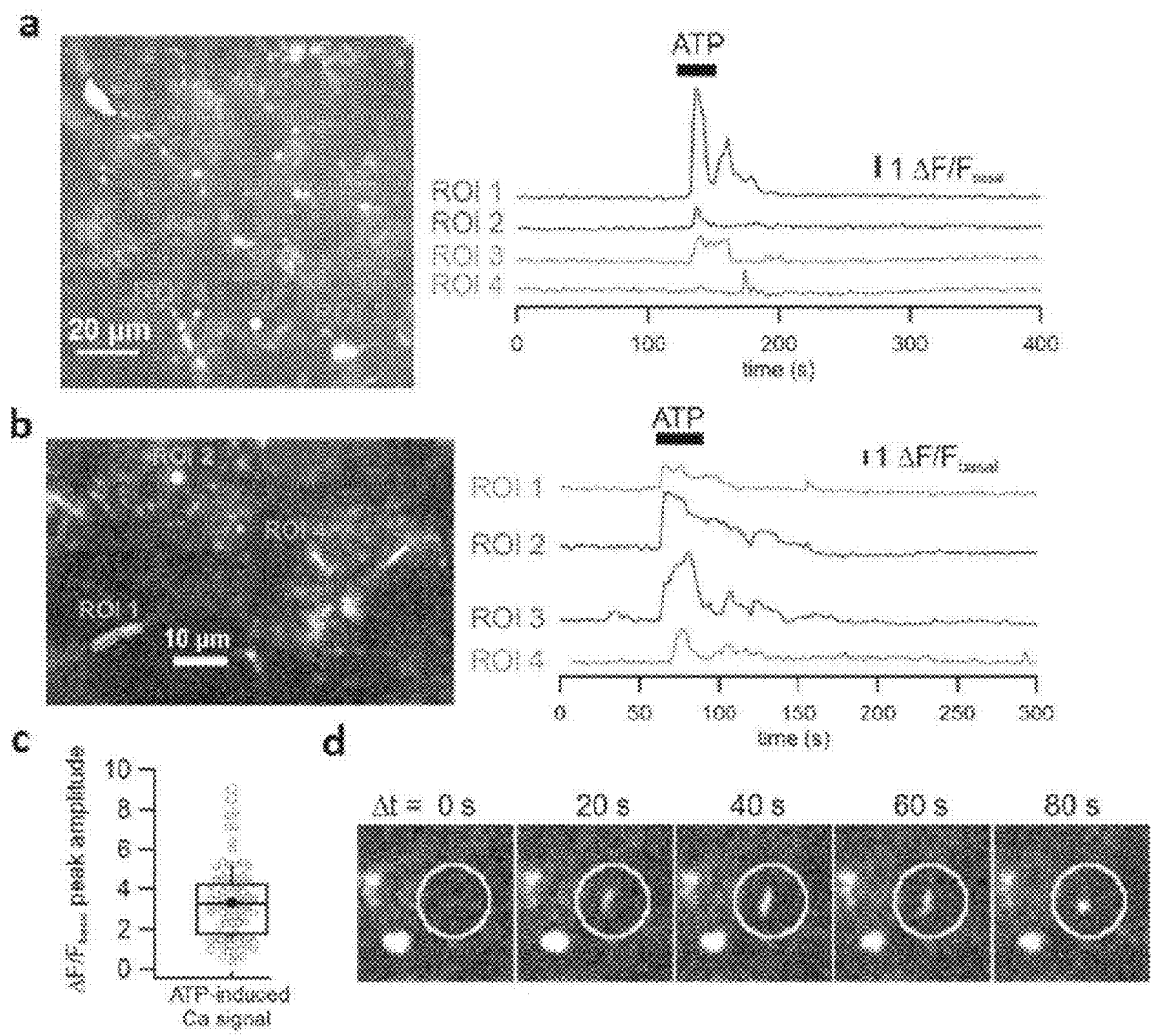
FIG. 5 shows the measurement results of $Ca^{2+}$ concentration changes in cerebellar microglia by expression of the intracellular $Ca^{2+}$ concentration indicator G-CaMP7.09.

Example 3: Live $Ca^{2+}$ Imaging by G-CaMP Expressed in Microglia of Cerebellum by the AAV Vector of the Present Invention Whether the method of the microglia-selective gene expression of the present invention was effective for the fluorescent calcium-sensitive molecule, G-CaMP7.09 was investigated (Non Patent Literature 4). In the cerebellum was injected AAV. Iba1. miR-9. T miR-129-2-3p. T expressing G-CaMP7.09, and 7 to 12 days later, transduced microglia were identified in the granule cell layer of acute cerebellar slices. When ATP (100 µM) was perfused and acted on the cerebellar slices, the increase in $Ca^{2+}$ was induced in the large intracellular compartments of G-CaMP-expressing microglia (FIG. 5a, microglial cell bodies or larger microglial projections) as well as in the small compartments (FIG. 5b, microglial microprojections). The mean peak amplitude of ATP-induced $Ca^{2+}$ signal change ($\Delta F/F_{basal}$, see the method) was 3.36±0.19 (FIG. 5c, the intracellular compartments in five cerebellar slices obtained from two mice, n=91). These results are consistent with typical microglial $Ca^{2+}$ dynamics reported in the past, in which the microglia express purine receptors and exhibit ATP-induced $Ca^{2+}$ responses on the order of seconds. Moreover, some G-CaMP positive cells exhibit microglial projection movement (FIG. 5d), and the portion thereof increased their motility after ATP application. These results are also consistent with the morphological dynamics property of microglia. Based on the aforementioned results, it has been clarified that the AAV vector of the present invention used enabled to express the $Ca^{2+}$-sensitive molecule, G-CaMP in the microglia and to monitor live imaging of intracellular $Ca^{2+}$ dynamics. In other words, it has been indicated that the microglia-specific gene expression method by using the AAV vector of the present invention can be applied to the expression of various functional genes.

Figure 6:
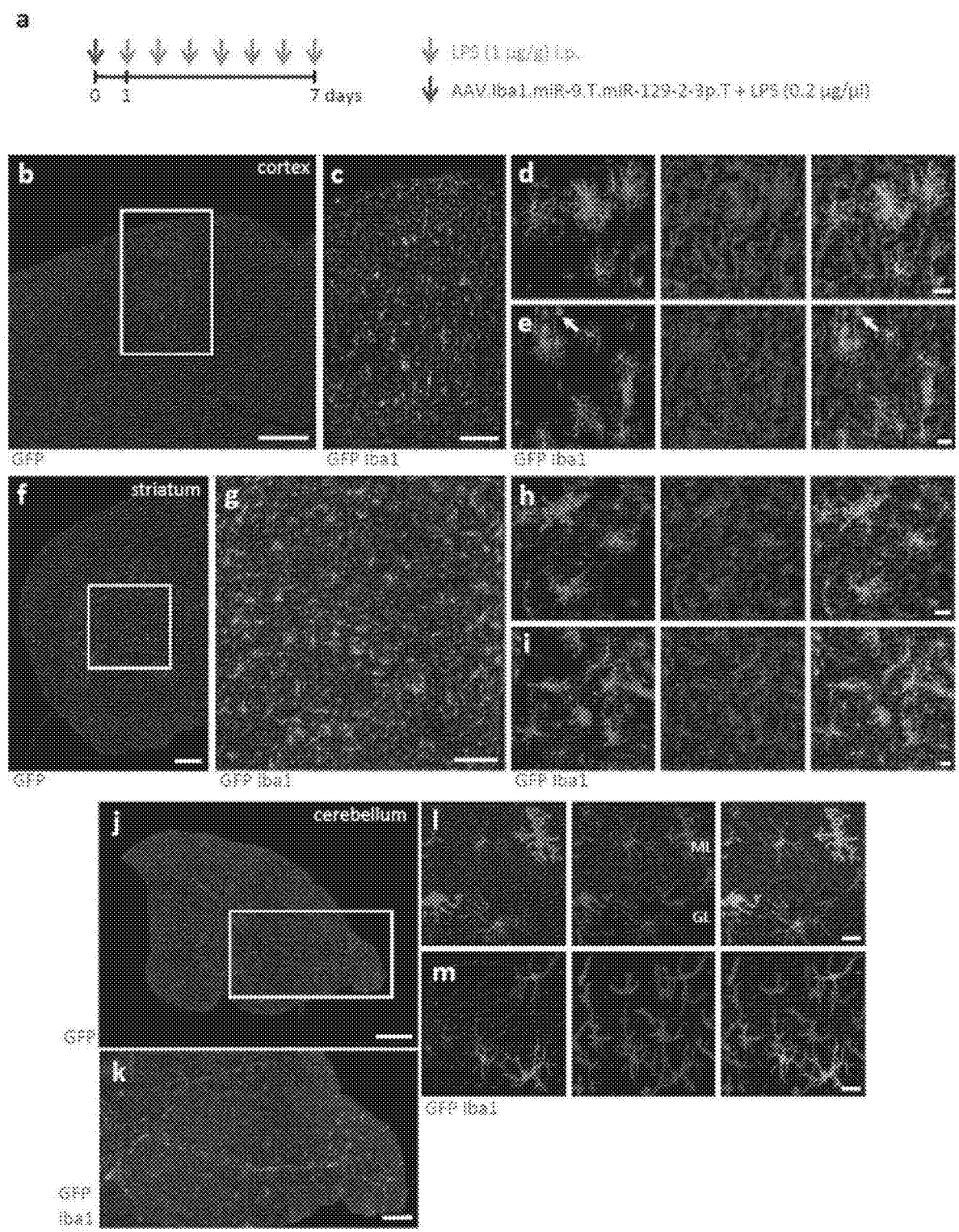
FIG. 6 shows that the microglia can be transduced with the AAV vector created in this study even in mice with encephalitis caused by lipopolysaccharide (LPS) treatment.

Example 4: Transduction of Reactive Microglia by AAV. Iba1. miR-9. T. miR-129-2-3p. T in LPS-Treated Mice It has been reported that microglia and monocytes produce little miR-9, however, when treated with a lipopolysaccharide (LPS), they induce miR-9 production. Therefore, in microglia after LPS treatment, transgene mRNAs containing miR-9. T may be degraded in the LPS-treated microglia. In order to verify the availability of AAV. Iba1. miR-9. T. miR-129-2-3p. T in reactive microglia activated by LPS, AAV. Iba1. miR-9. T. miR-129-2-3p. T was injected into adult mice with LPS (0.2 µg/µl), and then LPS (0.2 µg/body weight (g)) was injected intraperitoneally daily for 1 week (FIG. 6a). Subsequently, those mice were sacrificed for immunohistochemical staining to observe gene-expressing cells in the brain regions injected with the AAV vector. As a result, the strong microglia-specific GFP expression was observed in all three brain regions (FIGS. 6b to 6m). The transduced microglia in the LPS-treated mice were more in number and characterized by shorter and thicker projections, compared to mice without LPS treatment. These results indicated that AAV. Iba1. miR-9. T. miR-129-2-3p. T could also be used for specific gene expression to reactive microglia.

Example 5: Transduction to Microglia in Cerebellum of SCA1-Tg Mouse by AAV. Iba1. miR-9. T. miR-129-2-3p. T Microglia recognize the specific structure of LPS via Toll-like receptor 4, resulting in release of proinflammatory cytokines. On the other hand, the microglia in neurodegenerative tissues are activated via the scavenger receptor that induces phagocytosis of apoptotic cell debris and anti-inflammatory cytokine release. Thus, reactive microglia in neurodegenerative tissues differ from LPS-exposed microglia in their activation mode and can produce different micro RNAs. Then, whether or not AAV. Iba1. miR-9. T. miR-129-2-3p. T could be used for transduction to microglia in neurodegenerative tissues was investigated. As a model of neurodegenerative disease, spinocerebellar ataxia type 1 (SCA1) transgenic (SCA1-Tg) mice expressing ATXN1 with an abnormally elongated polyglutamine chain under the control of a Purkinje cell-specific L7 promoter, was selected. To the cerebella of 24-week-old SCA1-Tg mice showing ataxia and their wild-type littermates was injected AAV. Iba1. miR −9. T. miR-129-2-3p. T.

Figure 7:
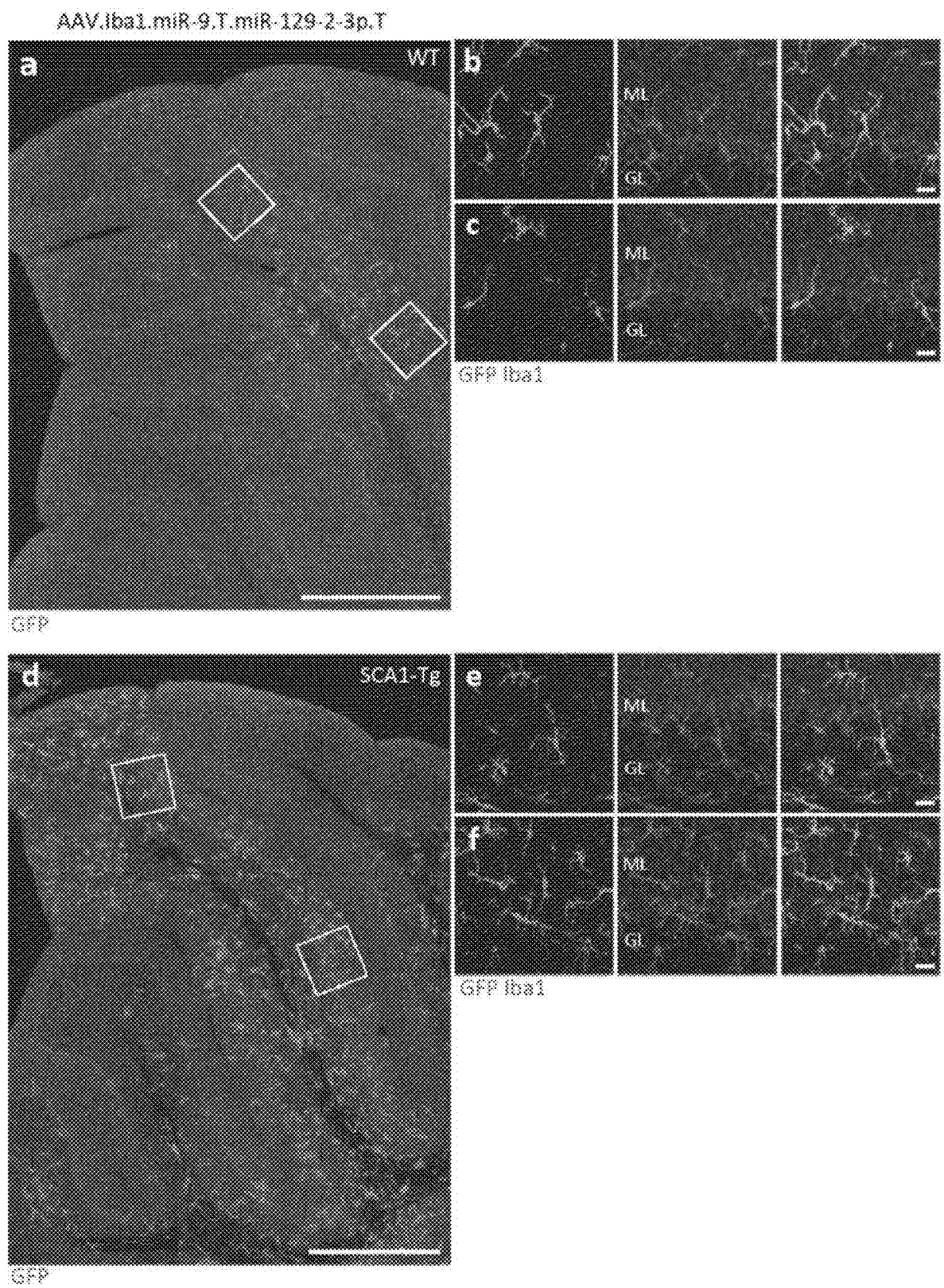
FIG. 7 is fluorescence microscopic views (photomicrographs) of exhibiting remarkable transduction to microglia with the AAV vector created in this study in the cerebellum of spinocerebellar ataxia type 1 (SCA1) transgenic mouse (hereafter also referred to as SCA1-Tg mouse). The AAV. Iba1. miR-9. T. miR-129-2-3p. T expressing GFP was injected into each of the cerebella of a wild-type mouse and a SCA 1-Tg mouse, respectively, at 24 weeks of age. One week after injection, cerebellar sections were prepared and analyzed by immunohistochemistry.

Three weeks after viral vector injection, the cerebellar sections were prepared and immunolabeled with the antibodies against GFP and Iba1. The confocal laser microscopy revealed that the SCA1-Tg mice and their wild-type littermates both exhibited efficient and specific transduction to microglia (FIG. 7). In particular, the SCA1-Tg mice exhibited transduction in a much larger population of microglia than the wild-type littermates. These results indicated that AAV. Iba1. T. miR-9. T. miR-129-2-3p. T is also useful for specific gene expression to microglia localized in neurodegenerative tissues.

What is claimed is:

1. A gene modified adeno-associated viral vector for gene expression in microglia, comprising an expression unit comprising an Iba1 (ionized calcium-binding adaptor molecule 1) promoter, a complementary sequence of miR-9 and a complementary sequence of miR-129.

2. The vector according to claim 1, further comprising a target gene arranged under the control of the Iba1 promoter.

3. The vector according to claim 2, wherein the target gene is a green fluorescent protein (GFP) gene.

4. The vector according to claim 1, comprising each of a complementary sequence of miR-9 and/or a complementary sequence of miR-129 that is repeated a plurality of times.

5. The vector according to claim 1, further comprising a woodchuck hepatitis virus post-transcriptional regulatory element (WPRE) gene.

6. The vector according to claim 1, comprising a base sequence represented by SEQ. ID No. 1 or a base sequence that is at least 90% identical to the base sequence represented by SEQ. ID No. 1.

7. The vector according to claim 1, comprising a base sequence represented by SEQ. ID No. 2 or a base sequence that is at least 90% identical to the base sequence represented by SEQ. ID No. 2.

8. The vector according to claim 1, being combined for use with a vector for capsid gene expression.

9. The vector according to claim 1, being combined for use with a vector for gene expression responsible for a helper action of adenovirus.

10. A recombinant virus obtained from the vector according to claim 1.

11. A medicament comprising the vector according to claim 1.

12. A method for transfecting a gene to a cell, comprising a step of transfecting a target gene into a target cell in vitro by using the vector according to claim 1.

13. The method according to claim 12, wherein the target cell is a central nervous system neuron.

14. An isolated cell into which the vector according to claim 1 was transfected.

15. A method for treating central nervous system disease, comprising injecting the vector according to claim 1 into brain parenchyma.

* * * * *

SEQUENCE LISTING

```
<160> NUMBER OF SEQ ID NOS: 33

<210> SEQ ID NO 1
<211> LENGTH: 2971
<212> TYPE: DNA
<213> ORGANISM: Artificial Sequence
<220> FEATURE:
<223> OTHER INFORMATION: AAV genome mIba1 WPRE miR9-Tx4
<220> FEATURE:
<221> NAME/KEY: gene
<222> LOCATION: (1)..(186)
<223> OTHER INFORMATION: L-ITR
<220> FEATURE:
<221> NAME/KEY: gene
<222> LOCATION: (193)..(1870)
<223> OTHER INFORMATION: mIba1
<220> FEATURE:
<221> NAME/KEY: gene
<222> LOCATION: (1871)..(2465)
<223> OTHER INFORMATION: WPRE
<220> FEATURE:
<221> NAME/KEY: gene
<222> LOCATION: (2485)..(2506)
<223> OTHER INFORMATION: miR-9.T
<220> FEATURE:
<221> NAME/KEY: gene
<222> LOCATION: (2511)..(2532)
<223> OTHER INFORMATION: miR-9.T
<220> FEATURE:
<221> NAME/KEY: gene
<222> LOCATION: (2539)..(2560)
<223> OTHER INFORMATION: miR-9.T
<220> FEATURE:
<221> NAME/KEY: gene
<222> LOCATION: (2565)..(2586)
<223> OTHER INFORMATION: miR-9.T
<220> FEATURE:
<221> NAME/KEY: gene
<222> LOCATION: (2634)..(2762)
<223> OTHER INFORMATION: SV40pA
<220> FEATURE:
<221> NAME/KEY: gene
<222> LOCATION: (2786)..(2971)
<223> OTHER INFORMATION: R-ITR

<400> SEQUENCE: 1
cagctgcgcg ctcgctcgct cactgaggcc gcccgggcaa agcccgggcg tcgggcgacc      60
tttggtcgcc cggcctcagt gagcgagcga gcgcgcagag agggagtggc caactccatc     120
actaggggtt ccttgtagtt aatgattaac ccgccatgct acttatctac gtagccatgc     180
tctagactcg agtactatag gatgcatcgt gaaaacctcg tttccaccag gaactgaggt     240
tgctgctgga ggaaatctcc catgaagagc tgttaactgg ggaactggtt ggatccagct     300
cctacaagct ctcctttaat ttccatacac atgccaagct gtgaacacct gcacacacag     360
tacaaataaa acagtagaaa tgaaatgaaa attaaaacaa aaacagcata ctttctcctt     420
tctacccaca tatctcctgc atccctgaga gcaatttctt ggccatcttc cataatcatg     480
ctattcaaac ctgccctcta agtacagagc tctgaatgga gaccacggga gcagactttt     540
catctgttgg ctccctgggc ctagcagtgt accctgcaaa caggaaacct tcgctcatca     600
```

-continued

```
tttatcacat gaatgtggct agagaactgt ccccaccaga cactgagagc ctctcacagg      660
gccagagggt ggctgcctca aaggcaggcg agaggctgca gtcttctgca gagtggacag      720
atactgcctg ccatacaagg ggacatagcc tggggcgggg ggcacaaggg aaggggcctg      780
agtgcattgg agtcacagcc ctccctcccc tggtgaccca gtgactgagg ggaccaaggc      840
tatccctggt atgagggggag ggcatttgca tgagttagac ccctgacagc ccatggtggg     900
gacaggaagt agctctgtct actgtctctt tcagtctcac tttctgttcc tccaaagtgt      960
ctcttcaaac tctcaaatga cttttgtagat tcagcctaag atctcaaagc aggtgaggca    1020
ggaggctggc actcaagagc ctgacgaaca caaacccaag tccttctggg acatgtctcc    1080
atgtgtcccc agtgctcctc tgtagcccct gagagaggtt tctttccttt ccagggcgct    1140
aggctcagct caccccattc ctggagcagc ctgcagactt catcctctct cttccatccc    1200
ggggaaagtc agccagtcct cctcagctgc ctgtcttaac ctgcatcatg aagcctgagg    1260
agatttcaag taaaccctcc caagcccac ctcaggatct ggggaaagcc actgtctacc     1320
gcatccttgg tttgagacag gttcttactg tgttggcctg gctgggttcc aactcccagg    1380
atcctctagc ctcagcctct cttaggtgct agattgcagg cctagggtat cacgctcggt    1440
ccctcagatc ctggtgcctt tccacacctc cgggagctga tctaagtctt tctcccacgt    1500
acagtctgct tctttggagg agctgtgtgg agctaggtgt gttacagggc tgtagctcca    1560
gccatctggg aggctgaggc aggatggcta cttcaattct caagagcctg ataggagac     1620 cctgccccca ccccacccc aaagtaattt ttcagcacat tacttcttca tctcctctct     1680
caacccgttc tgccttctcc tggggtgctg tgtcagcag aagctgatgt ggaagtgatg     1740
cctgggagtt agcaagggaa tgagtggaaa ggggaagtgt gagaacggtc ccagaagaga    1800
ctggggagct ggtggagaga ggacccagcg gacagactgc cagcctaaga caaccagcgt    1860
ctgaggagcc cgataatcaa cctctggatt acaaaatttg tgaaagattg actggtattc    1920
ttaactatgt tgctcctttt acgctatgtg gatacgctgc tttaatgcct ttgtatcatg    1980
ctattgcttc ccgtatggct ttcatttct cctccttgta taaatcctgg ttgctgtctc    2040
tttatgagga gttgtggccc gttgtcaggc aacgtggcgt ggtgtgcact gtgtttgctg    2100
acgcaacccc cactggttgg ggcattgcca ccacctgtca gctccttccc gggactttcg    2160 ctttcccct ccctattgcc acggcggaac tcatcgccgc ctgccttgcc cgctgctgga     2220
caggggctcg gctgttgggc actgacaatt ccgtggtgtt gtcggggaag ctgacgtcct    2280
ttccatggct gctcgcctgt gttgccacct ggattctgcg cgggacgtcc ttctgctacg    2340
tcccttcggc cctcaatcca gcggaccttc cttcccgcgg cctgctgccg gctctgcggc    2400
ctcttccgcg tcttcgcctt cgccctcaga cgagtcggat ctccctttgg gccgcctccc    2460
cgcatcgatg ccgtatacgg tacctcatac agctagataa ccaaagcgat tcatacagct    2520
agataaccaa agcaattgtc atacagctag ataaccaaag tcactcatac agctagataa    2580
ccaaaggcta gccgatctta agtcacggat cctctagtag agtcgaggaa ttcacttgtt    2640
tattgcagct tataatggtt acaaataaag caatagcatc acaaatttca caaataaagc    2700
atttttttca ctgcattcta gttgtggttt gtccaaactc atcaatgtat cttatcatgt    2760
ctgtcgaccc ccaacgcgtt ggagctctag agcatggcta cgtagataag tagcatggcg    2820
ggttaatcat taactacaag gaaccccag tgatggagtt ggccactccc tctctgcgcg     2880
ctcgctcgct cactgaggcc gggcgaccaa aggtcgcccg acgcccgggc tttgcccggg    2940
cggcctcagt gagcgagcga gcgcgcagct g                                    2971
```

<210> SEQ ID NO 2
<211> LENGTH: 3059
<212> TYPE: DNA
<213> ORGANISM: Artificial Sequence
<220> FEATURE:
<223> OTHER INFORMATION: AAV genome mIba1 WPRE miR9-Tx4 miR129Tx4
<220> FEATURE:
<221> NAME/KEY: gene
<222> LOCATION: (1)..(186)
<223> OTHER INFORMATION: L-ITR
<220> FEATURE:
<221> NAME/KEY: gene
<222> LOCATION: (193)..(1870)
<223> OTHER INFORMATION: mIba1
<220> FEATURE:
<221> NAME/KEY: gene
<222> LOCATION: (1871)..(2465)
<223> OTHER INFORMATION: WPRE
<220> FEATURE:
<221> NAME/KEY: gene
<222> LOCATION: (2485)..(2506)
<223> OTHER INFORMATION: miR-9.T
<220> FEATURE:
<221> NAME/KEY: gene
<222> LOCATION: (2511)..(2532)
<223> OTHER INFORMATION: miR-9.T
<220> FEATURE:
<221> NAME/KEY: gene
<222> LOCATION: (2539)..(2560)
<223> OTHER INFORMATION: miR-9.T
<220> FEATURE:
<221> NAME/KEY: gene
<222> LOCATION: (2565)..(2586)
<223> OTHER INFORMATION: miR-9.T
<220> FEATURE:
<221> NAME/KEY: gene
<222> LOCATION: (2593)..(2614)
<223> OTHER INFORMATION: miR-129-2-3p.T
<220> FEATURE:
<221> NAME/KEY: gene
<222> LOCATION: (2619)..(2640)
<223> OTHER INFORMATION: miR-129-2-3p.T
<220> FEATURE:
<221> NAME/KEY: gene
<222> LOCATION: (2647)..(2668)
<223> OTHER INFORMATION: miR-129-2-3p.T
<220> FEATURE:
<221> NAME/KEY: gene
<222> LOCATION: (2673)..(2694)
<223> OTHER INFORMATION: miR-129-2-3p.T
<220> FEATURE:
<221> NAME/KEY: gene
<222> LOCATION: (2722)..(2850)
<223> OTHER INFORMATION: SV40pA
<220> FEATURE:
<221> NAME/KEY: gene
<222> LOCATION: (2874)..(3059)
<223> OTHER INFORMATION: R-ITR

<400> SEQUENCE: 2

```
cagctgcgcg ctcgctcgct cactgaggcc gcccgggcaa agcccgggcg tcgggcgacc      60
tttggtcgcc cggcctcagt gagcgagcga gcgcgcagag agggagtggc caactccatc     120
actaggggtt ccttgtagtt aatgattaac ccgccatgct acttatctac gtagccatgc     180
tctagactcg agtactatag gatgcatcgt gaaaacctcg tttccaccag gaactgaggt     240
tgctgctgga ggaaatctcc catgaagagc tgttaactgg ggaactggtt ggatccagct     300
cctacaagct ctcctttaat ttccatacac atgccaagct gtgaacacct gcacacacag     360
tacaaataaa acagtagaaa tgaaatgaaa attaaaacaa aaacagcata ctttctcctt     420
tctacccaca tatctcctgc atccctgaga gcaatttctt ggccatcttc cataatcatg     480
```

```
ctattcaaac ctgccctcta agtacagagc tctgaatgga gaccacggga gcagactttt     540
catctgttgg ctccctgggc ctagcagtgt accctgcaaa caggaaacct tcgctcatca     600
tttatcacat gaatgtggct agagaactgt ccccaccaga cactgagagc ctctcacagg     660
gccagagggt ggctgcctca aaggcaggcg agaggctgca gtcttctgca gagtggacag     720
atactgcctg ccatacaagg ggacatagcc tggggcgggg ggcacaaggg aaggggcctg     780
agtgcattgg agtcacagcc ctccctcccc tggtgaccca gtgactgagg ggaccaaggc     840
tatccctggt atgaggggag ggcatttgca tgagttagac ccctgacagc ccatggtggg     900
gacaggaagt agctctgtct actgtctctt tcagtctcac tttctgttcc tccaaagtgt     960
ctcttcaaac tctcaaatga ctttgtagat tcagcctaag atctcaaagc aggtgaggca    1020
ggaggctggc actcaagagc ctgacgaaca caaacccaag tccttctggg acatgtctcc    1080
atgtgtcccc agtgctcctc tgtagcccct gagagaggtt tctttccttt ccagggcgct    1140
aggctcagct caccccattc ctggagcagc ctgcagactt catcctctct cttccatccc    1200
ggggaaagtc agccagtcct cctcagctgc ctgtcttaac ctgcatcatg aagcctgagg    1260
agatttcaag taaaccctcc caagccccac ctcaggatct ggggaaagcc actgtctacc    1320
gcatccttgg tttgagacag gttcttactg tgttggcctg gctgggttcc aactcccagg    1380
atcctctagc ctcagcctct cttaggtgct agattgcagg cctagggtat cacgctcggt    1440
ccctcagatc ctggtgcctt tccacacctc cgggagctga tctaagtctt tctcccacgt    1500
acagtctgct tctttggagg agctgtgtgg agctaggtgt gttacagggc tgtagctcca    1560
gccatctggg aggctgaggc aggatggcta cttcaattct caagagcctg ataggagac    1620
cctgccccca ccccaccccc aaagtaattt tcagcacat tacttcttca tctcctctct    1680
caacccgttc tgccttctcc tggggtgctg tgtcagcag aagctgatgt ggaagtgatg    1740
cctgggagtt agcaagggaa tgagtggaaa ggggaagtgt gagaacggtc ccagaagaga    1800
ctggggagct ggtggagaga ggacccagcg gacagactgc cagcctaaga caaccagcgt    1860
ctgaggagcc cgataatcaa cctctggatt acaaaatttg tgaaagattg actggtattc    1920
ttaactatgt tgctcctttt acgctatgtg gatacgctgc tttaatgcct ttgtatcatg    1980
ctattgcttc ccgtatggct ttcattttct cctccttgta taaatcctgg ttgctgtctc    2040
tttatgagga gttgtggccc gttgtcaggc aacgtggcgt ggtgtgcact gtgtttgctg    2100
acgcaacccc cactggttgg ggcattgcca ccacctgtca gctcctttcc gggactttcg    2160
ctttccccct ccctattgcc acggcggaac tcatcgccgc ctgccttgcc cgctgctgga    2220
caggggctcg gctgttgggc actgacaatt ccgtggtgtt gtcggggaag ctgacgtcct    2280
ttccatggct gctcgcctgt gttgccacct ggattctgcg cgggacgtcc ttctgctacg    2340
tcccttcggc cctcaatcca gcggaccttc cttcccgcgg cctgctgccg gctctgcggc    2400
ctcttccgcg tcttcgcctt cgccctcaga cgagtcggat ctccctttgg gccgcctccc    2460
cgcatcgatg ccgtatacgg tacctcatac agctagataa ccaaagcgat tcatacagct    2520
agataaccaa agcaattgtc atacagctag ataaccaaag tcactcatac agctagataa    2580
ccaaaggcta gcatgctttt tgggtaagg gcttcgatat gcttttggg gtaagggctt    2640
cttaagatgc ttttgggt aagggctttc acatgctttt tggggtaagg gcttggatcc    2700
tctagtagag tcgaggaatt cacttgttta ttgcagctta taatggttac aaataaagca    2760
atagcatcac aaatttcaca aataaagcat tttttcact gcattctagt tgtggtttgt    2820
ccaaactcat caatgtatct tatcatgtct gtcgaccccc aacgcgttgg agctctagag    2880
```

```
catggctacg tagataagta gcatggcggg ttaatcatta actacaagga acccctagtg    2940
atggagttgg ccactccctc tctgcgcgct cgctcgctca ctgaggccgg gcgaccaaag    3000
gtcgcccgac gcccgggctt tgcccgggcg gcctcagtga gcgagcgagc gcgcagctg    3059

<210> SEQ ID NO 3
<211> LENGTH: 1678
<212> TYPE: DNA
<213> ORGANISM: Artificial Sequence
<220> FEATURE:
<223> OTHER INFORMATION: mIba1 promoter

<400> SEQUENCE: 3
tactatagga tgcatcgtga aacctcgtt ccaccagga actgaggttg ctgctggagg      60
aaatctccca tgaagagctg ttaactgggg aactggttgg atccagctcc tacaagctct   120
cctttaattt ccatacacat gccaagctgt gaacacctgc acacacagta caaataaaac   180
agtagaaatg aaatgaaaat taaacaaaa acagcatact ttctcctttc tacccacata    240
tctcctgcat ccctgagagc aatttcttgg ccatcttcca taatcatgct attcaaacct   300
gccctctaag tacagagctc tgaatggaga ccacgggagc agacttttca tctgttggct   360
ccctgggcct agcagtgtac cctgcaaaca ggaaaccttc gctcatcatt tatcacatga   420
atgtggctag agaactgtcc ccaccagaca ctgagagcct ctcacagggc cagagggtgg   480
ctgcctcaaa ggcaggcgag aggctgcagt cttctgcaga gtggacagat actgcctgcc   540
atacaagggg acatagcctg gggcgggggg cacaagggaa ggggcctgag tgcattggag   600
tcacagccct ccctcccctg gtgacccagt gactgagggg accaaggcta tccctggtat   660
gagggggagg catttgcatg agttagaccc ctgacagccc atggtgggga caggaagtag   720
ctctgtctac tgtctctttc agtctcactt tctgttcctc caaagtgtct cttcaaactc   780
tcaaatgact ttgtagattc agcctaagat ctcaaagcag gtgaggcagg aggctggcac   840
tcaagagcct gacgaacaca aacccaagtc cttctgggac atgtctccat gtgtcccag    900 tgctcctctg tagcccctga gagaggtttc tttcctttcc agggcgctag gctcagctca   960
ccccattcct ggagcagcct gcagacttca tcctctctct tccatcccgg ggaaagtcag   1020
ccagtcctcc tcagctgcct gtcttaacct gcatcatgaa gcctgaggag atttcaagta   1080
aaccctccca agccccacct caggatctgg ggaaagccac tgtctaccgc atccttggtt   1140
tgagacaggt tcttactgtg ttggcctggc tgggttccaa ctcccaggat cctctagcct   1200
cagcctctct taggtgctag attgcaggcc tagggtatca cgctcggtcc ctcagatcct   1260
ggtgcctttc cacacctccg ggagctgatc taagtctttc tcccacgtac agtctgcttc   1320
tttggaggag ctgtgtggag ctaggtgtgt tacagggctg tagctccagc catctgggag   1380
gctgaggcag gatggctact tcaattctca agagcctgga taggagaccc tgcccccacc   1440
ccacccccaa agtaattttt cagcacatta cttcttcatc tcctctctca acccgttctg   1500
ccttctcctg gggtgctggt gtcagcagaa gctgatgtgg aagtgatgcc tgggagttag   1560
caagggaatg agtggaaagg ggaagtgtga gaacggtccc agaagagact ggggagctgg   1620
tggagagagg acccagcgga cagactgcca gcctaagaca accagcgtct gaggagcc     1678

<210> SEQ ID NO 4
<211> LENGTH: 2146
<212> TYPE: DNA
<213> ORGANISM: Artificial Sequence
<220> FEATURE:
```

<223> OTHER INFORMATION: human Iba1 promoter

<400> SEQUENCE: 4

```
aaaaactggg gaccattggc aataatactc ctatgtcccc tcttccctac tttgttttcc      60
tccataggca cctggcgcct tttttttttt tttttttttt tttttgagac ggagtctcac     120
tctgttgccc aggctggagt gcaatggcgc gatctcagct cactgcaacc tctgcctccc     180
gggtttaagc gattcgcctg cgtcagcctc ctgagcagct gggattacag gcacgcacca     240
ccaggccctg ctaattttg tatttttagt agagatgggg tttcaccatg ttggtcaggc      300
tggtctccaa ctcctgacct tgtgatccgc ctgcccagc ctcccaaagt gctgtgatta      360
caggcgtgag ccactgcgcc tggccaccta gcacctttaa tatacttatt tatttgtatt     420
gtctgccttc cccaattaga tcaaccatga agacaagagt tttcatttgt tgggttctct     480
gggcctagag gcatgtctgg catatagtaa gcattcagta aatatctgtt gagtgaacgt     540
atgaataaag aagtgagttc ctcccagcag gcactgagaa cattgggagt acagggttgc     600
agctctctct gcagcaggag aatgtagctg caataaaggg aagtcaagaa gccagagtcc     660
agccaggtgc agtggctcat gcctgtaatc ccagcacttt gggaggctga ggtgggtgga     720
tcacaaggtc aagagataga gaccatcctg gccaacatgg cgaaacccca tctgtactaa     780
aaatacaaaa attagctggg cgtggtggtg ggcgcctgta gtcccagcta ctcaggaggc     840
tgaggtagga gaattgcttg aacccaggag gcagtggttg cagtgagccg agattgcacc     900
attgcactcc cgcctgggcg acagagcaag actccgactc aaaaaaaaaa aaaaaagcag    960
cagcagcagc cagaggccac tccagcatct cccctacctg gcttgggtca gggagagggc    1020
agtgagaagt gaaaactccc agctacagaa aggaaatat gttgggggga agggagaagg     1080
aaaggtgtct tcatcaatgc cggggcaggg tagatggagc cctgggcagg gagtttggac   1140
caggaaatct caatgaggga aatgtgctgt cctcacctct ccaagaagcg actggccaaa    1200
cagagtgaca gaggggataa aggttatgcc tagggaggca tgtgtcagag gctatcatcc    1260
actctgttga acccacagtg accagcacca ccatcacaca aacatgcctg catgtgtgca    1320
cgcacgtgca gtgtgcaaac ctgatgtcag cctcactccc tggctcttct gtccacaaac    1380
gctgtttctt taagtaccac tttcagttcc tccaaagaat ctacttaaac tcttaaattc    1440
ctgatctcta tagattttac taaagatttc aaaggagata agatgagagg gttacgttgc    1500
acattctaaa gcaaacaaat taaaatgttt tgttagacat ttccatattt ttaagggcct    1560
ccttggagct gccaggctgg gagtgaggtt tctctccctt tctaaaccct gtgcccatct    1620
tgtcaccctc ctggagctgc cagcagactt cagattcttc tccgatctac agagcagaaa    1680
aattcagcca gccttcctt gtcttcctat ccacagctgc ctgcccagac tcatgaaacc     1740
tgacaaaatg caaggtctta tcattacctg aaccttggac ctgttcaaaa atactagttc    1800
ctgagaataa atatccctgg tgtcttcctg cccttcctgc acacctccag tggcttatca    1860
aaatatttgt ttcatgcgca cactgggctc tcatttaaga ggaatttggg agaatgttat   1920
tttctaatct gcatttcaca ccaggctccc cctccttcct ggggtgctag tgtcagcaga    1980
acctgatggg gaagtgaggt ctgggaggca gaggaggaag gaatgagggg aaaggggaag    2040
tttgggagga aggcttctga gaagactggt gggagagaag gagagcctgc agacagaggc    2100
ctccagcttg gtctgtctcc ccacctctac cagcatctgc tgagct                   2146
```

<210> SEQ ID NO 5
<211> LENGTH: 720

```
<212> TYPE: DNA
<213> ORGANISM: Artificial Sequence
<220> FEATURE:
<223> OTHER INFORMATION: EGFP

<400> SEQUENCE: 5
atggtgagca agggcgagga gctgttcacc ggggtggtgc ccatcctggt cgagctggac      60
ggcgacgtaa acggccacaa gttcagcgtg tccggcgagg gcgagggcga tgccacctac     120
ggcaagctga ccctgaagtt catctgcacc accggcaagc tgcccgtgcc ctggcccacc     180
ctcgtgacca ccctgaccta cggcgtgcag tgcttcagcc gctaccccga ccacatgaag     240
cagcacgact tcttcaagtc cgccatgccc gaaggctacg tccaggagcg caccatcttc     300
ttcaaggacg acggcaacta caagacccgc gccgaggtga agttcgaggg cgacaccctg     360
gtgaaccgca tcgagctgaa gggcatcgac ttcaaggagg acggcaacat cctggggcac     420
aagctggagt acaactacaa cagccacaac gtctatatca tggccgacaa gcagaagaac     480
ggcatcaagg tgaacttcaa gatccgccac aacatcgagg acggcagcgt gcagctcgcc     540
gaccactacc agcagaacac ccccatcggc gacggccccg tgctgctgcc cgacaaccac     600
tacctgagca cccagtccgc cctgagcaaa gaccccaacg agaagcgcga tcacatggtc     660
ctgctggagt tcgtgaccgc cgccgggatc actctcggca tggacgagct gtacaagtaa     720

<210> SEQ ID NO 6
<211> LENGTH: 22
<212> TYPE: DNA
<213> ORGANISM: Artificial Sequence
<220> FEATURE:
<223> OTHER INFORMATION: miRNA

<400> SEQUENCE: 6
tcatacagct agataaccaa ag                                               22

<210> SEQ ID NO 7
<211> LENGTH: 22
<212> TYPE: DNA
<213> ORGANISM: Artificial Sequence
<220> FEATURE:
<223> OTHER INFORMATION: miRNA

<400> SEQUENCE: 7
atgctttttg gggtaagggc tt                                               22

<210> SEQ ID NO 8
<211> LENGTH: 58
<212> TYPE: DNA
<213> ORGANISM: Artificial Sequence
<220> FEATURE:
<223> OTHER INFORMATION: oligo nucleotide

<400> SEQUENCE: 8
ctaatcatac agctagataa ccaaagcgat tcatacagct agataaccaa agacgcgt       58

<210> SEQ ID NO 9
<211> LENGTH: 49
<212> TYPE: DNA
<213> ORGANISM: Artificial Sequence
<220> FEATURE:
<223> OTHER INFORMATION: oligo nucleotide

<400> SEQUENCE: 9
tcatacagct agataaccaa agtcactcat acagctagat aaccaaagg                  49
```

<210> SEQ ID NO 10
<211> LENGTH: 56
<212> TYPE: DNA
<213> ORGANISM: Artificial Sequence
<220> FEATURE:
<223> OTHER INFORMATION: oligo nucleotide

<400> SEQUENCE: 10
ctttggttat ctagctgtat gaatcgcttt ggttatctag ctgtatgatt aggtac        56

<210> SEQ ID NO 11
<211> LENGTH: 59
<212> TYPE: DNA
<213> ORGANISM: Artificial Sequence
<220> FEATURE:
<223> OTHER INFORMATION: oligo nucleotide

<400> SEQUENCE: 11 gatcccttg gttatctagc tgtatgagtg actttggtta tctagctgta tgaacgcgt     59

<210> SEQ ID NO 12
<211> LENGTH: 55
<212> TYPE: DNA
<213> ORGANISM: Artificial Sequence
<220> FEATURE:
<223> OTHER INFORMATION: oligo nucleotide

<400> SEQUENCE: 12
ctcatacagc tagataacca aagcgattca tacagctaga taaccaaagc aattg         55

<210> SEQ ID NO 13
<211> LENGTH: 54
<212> TYPE: DNA
<213> ORGANISM: Artificial Sequence
<220> FEATURE:
<223> OTHER INFORMATION: oligo nucleotide

<400> SEQUENCE: 13
tcatacagct agataaccaa agtcactcat acagctagat aaccaaaggc tagc          54

<210> SEQ ID NO 14
<211> LENGTH: 54
<212> TYPE: DNA
<213> ORGANISM: Artificial Sequence
<220> FEATURE:
<223> OTHER INFORMATION: oligo nucleotide

<400> SEQUENCE: 14 atgcttttg gggtaagggc ttcgatatgc tttttggggt aagggcttct taag           54

<210> SEQ ID NO 15
<211> LENGTH: 49
<212> TYPE: DNA
<213> ORGANISM: Artificial Sequence
<220> FEATURE:
<223> OTHER INFORMATION: oligo nucleotide

<400> SEQUENCE: 15 atgcttttg gggtaagggc tttcacatgc tttttggggt aagggcttg                 49

<210> SEQ ID NO 16
<211> LENGTH: 53
<212> TYPE: DNA
<213> ORGANISM: Artificial Sequence
<220> FEATURE:
<223> OTHER INFORMATION: oligo nucleotide

<400> SEQUENCE: 16
ctttggttat ctagctgtat gaatcgcttt ggttatctag ctgtatgagg tac　　　　53

<210> SEQ ID NO 17
<211> LENGTH: 54
<212> TYPE: DNA
<213> ORGANISM: Artificial Sequence
<220> FEATURE:
<223> OTHER INFORMATION: oligo nucleotide

<400> SEQUENCE: 17
ctttggttat ctagctgtat gagtgacttt ggttatctag ctgtatgaca attg　　　54

<210> SEQ ID NO 18
<211> LENGTH: 54
<212> TYPE: DNA
<213> ORGANISM: Artificial Sequence
<220> FEATURE:
<223> OTHER INFORMATION: oligo nucleotide

<400> SEQUENCE: 18
aagcccttac cccaaaaagc atatcgaagc ccttacccca aaaagcatgc tagc　　　54

<210> SEQ ID NO 19
<211> LENGTH: 59
<212> TYPE: DNA
<213> ORGANISM: Artificial Sequence
<220> FEATURE:
<223> OTHER INFORMATION: oligo nucleotide

<400> SEQUENCE: 19
gatccaagcc cttaccccaa aaagcatgtg aaagcccctta ccccaaaaag catcttaag　　59

<210> SEQ ID NO 20
<211> LENGTH: 55
<212> TYPE: DNA
<213> ORGANISM: Artificial Sequence
<220> FEATURE:
<223> OTHER INFORMATION: oligo nucleotide

<400> SEQUENCE: 20
ctcatacagc tagataacca aagcgattca tacagctaga taaccaaagc aattg　　　55

<210> SEQ ID NO 21
<211> LENGTH: 54
<212> TYPE: DNA
<213> ORGANISM: Artificial Sequence
<220> FEATURE:
<223> OTHER INFORMATION: oligo nucleotide

<400> SEQUENCE: 21
tcatacagct agataaccaa agtcactcat acagctagat aaccaaaggc tagc　　　54

<210> SEQ ID NO 22
<211> LENGTH: 54
<212> TYPE: DNA
<213> ORGANISM: Artificial Sequence
<220> FEATURE:
<223> OTHER INFORMATION: oligo nucleotide

<400> SEQUENCE: 22
ccatcatcaa acaaatgga gtcgatccat catcaaaaca atggagtct taag　　　54

<210> SEQ ID NO 23

```
<210> SEQ ID NO 23
<211> LENGTH: 49
<212> TYPE: DNA
<213> ORGANISM: Artificial Sequence
<220> FEATURE:
<223> OTHER INFORMATION: oligo nucleotide

<400> SEQUENCE: 23
ccatcatcaa aacaaatgga gttcacccat catcaaaaca aatggagtg              49

<210> SEQ ID NO 24
<211> LENGTH: 53
<212> TYPE: DNA
<213> ORGANISM: Artificial Sequence
<220> FEATURE:
<223> OTHER INFORMATION: oligo nucleotide

<400> SEQUENCE: 24
ctttggttat ctagctgtat gaatcgcttt ggttatctag ctgtatgagg tac         53

<210> SEQ ID NO 25
<211> LENGTH: 54
<212> TYPE: DNA
<213> ORGANISM: Artificial Sequence
<220> FEATURE:
<223> OTHER INFORMATION: oligo nucleotide

<400> SEQUENCE: 25
ctttggttat ctagctgtat gagtgacttt ggttatctag ctgtatgaca attg        54

<210> SEQ ID NO 26
<211> LENGTH: 54
<212> TYPE: DNA
<213> ORGANISM: Artificial Sequence
<220> FEATURE:
<223> OTHER INFORMATION: oligo nucleotide

<400> SEQUENCE: 26
actccatttg ttttgatgat ggatcgactc catttgtttt gatgatgggc tagc        54

<210> SEQ ID NO 27
<211> LENGTH: 59
<212> TYPE: DNA
<213> ORGANISM: Artificial Sequence
<220> FEATURE:
<223> OTHER INFORMATION: oligo nucleotide

<400> SEQUENCE: 27
gatccactcc atttgttttg atgatgggtg aactccattt gttttgatga tggcttaag   59

<210> SEQ ID NO 28
<211> LENGTH: 20
<212> TYPE: DNA
<213> ORGANISM: Artificial Sequence
<220> FEATURE:
<223> OTHER INFORMATION: primer

<400> SEQUENCE: 28
cctagagcca tcttgtaagg                                              20

<210> SEQ ID NO 29
<211> LENGTH: 18
<212> TYPE: DNA
<213> ORGANISM: Artificial Sequence
<220> FEATURE:
<223> OTHER INFORMATION: primer

<400> SEQUENCE: 29
```

```
cgaggaattg ctgttgag                                                    18

<210> SEQ ID NO 30
<211> LENGTH: 41
<212> TYPE: DNA
<213> ORGANISM: Artificial Sequence
<220> FEATURE:
<223> OTHER INFORMATION: primer

<400> SEQUENCE: 30
atgctctaga ctcgagtact ataggatgca tcgtgaaaac c                          41

<210> SEQ ID NO 31
<211> LENGTH: 36
<212> TYPE: DNA
<213> ORGANISM: Artificial Sequence
<220> FEATURE:
<223> OTHER INFORMATION: primer

<400> SEQUENCE: 31
catggtggcg accggtggct cctcagacgc tggttg                                36

<210> SEQ ID NO 32
<211> LENGTH: 20
<212> TYPE: DNA
<213> ORGANISM: Artificial Sequence
<220> FEATURE:
<223> OTHER INFORMATION: primer

<400> SEQUENCE: 32
ctgttgggca ctgacaattc                                                  20

<210> SEQ ID NO 33
<211> LENGTH: 20
<212> TYPE: DNA
<213> ORGANISM: Artificial Sequence
<220> FEATURE:
<223> OTHER INFORMATION: primer

<400> SEQUENCE: 33
gaagggacgt agcagaagga                                                  20
```